United States Patent
Kitamura

(10) Patent No.: US 7,881,494 B2
(45) Date of Patent: Feb. 1, 2011

(54) CHARACTERISTIC POINT DETECTION OF TARGET OBJECT INCLUDED IN AN IMAGE

(75) Inventor: Yoshiro Kitamura, Kanagawa-ken (JP)

(73) Assignee: Fujifilm Corporation (JP)

( * ) Notice: Subject to any disclaimer, the term of this patent is extended or adjusted under 35 U.S.C. 154(b) by 1016 days.

(21) Appl. No.: 11/708,604

(22) Filed: Feb. 21, 2007

(65) Prior Publication Data

US 2007/0195996 A1    Aug. 23, 2007

(30) Foreign Application Priority Data

Feb. 22, 2006    (JP)    ............................. 2006-045493

(51) Int. Cl.
*G06K 9/00*    (2006.01)

(52) U.S. Cl. .................................... 382/103

(58) Field of Classification Search .................. 382/103
See application file for complete search history.

(56) References Cited

U.S. PATENT DOCUMENTS

| | | | |
|---|---|---|---|
| 6,590,999 B1 * | 7/2003 | Comaniciu et al. .......... | 382/103 |
| 2003/0103647 A1 * | 6/2003 | Rui et al. .................... | 382/103 |
| 2005/0169529 A1 * | 8/2005 | Owechko et al. ............ | 382/190 |
| 2005/0185826 A1 * | 8/2005 | Georgescu et al. .......... | 382/103 |
| 2007/0230797 A1 * | 10/2007 | Hisanaga .................... | 382/195 |
| 2008/0063236 A1 * | 3/2008 | Ikenoue et al. .............. | 382/103 |
| 2009/0041357 A1 * | 2/2009 | Yonezawa et al. ........... | 382/195 |

FOREIGN PATENT DOCUMENTS

JP    6-348851    12/1994

OTHER PUBLICATIONS

Cristinacce et al., In Proc. of BMVC, 2004, pp. 231-240.

* cited by examiner

*Primary Examiner*—Bhavesh Mehta
*Assistant Examiner*—David P Rashid
(74) *Attorney, Agent, or Firm*—Studebaker & Brackett PC; Donald R. Studebaker

(57) ABSTRACT

A characteristic point detection method, including the steps of: detecting a candidate of each of a plurality of characteristic points of a predetermined object from a detection target image; obtaining an existence probability distribution for a target characteristic point with respect to each of the detected candidates of the other characteristic points, which is an existence probability distribution of the target characteristic point when the position of the detected candidate of another characteristic point is taken as a reference, using an existence probability distribution statistically obtained for each combination of two different characteristic points of the plurality of characteristic points; integrating the obtained existence probability distributions by weighting according to the positional relationship between the reference characteristic point and target characteristic point; and estimating the true point of the target characteristic point based on the magnitude of the existence probabilities in the integrated existence probability distribution thereof.

27 Claims, 12 Drawing Sheets

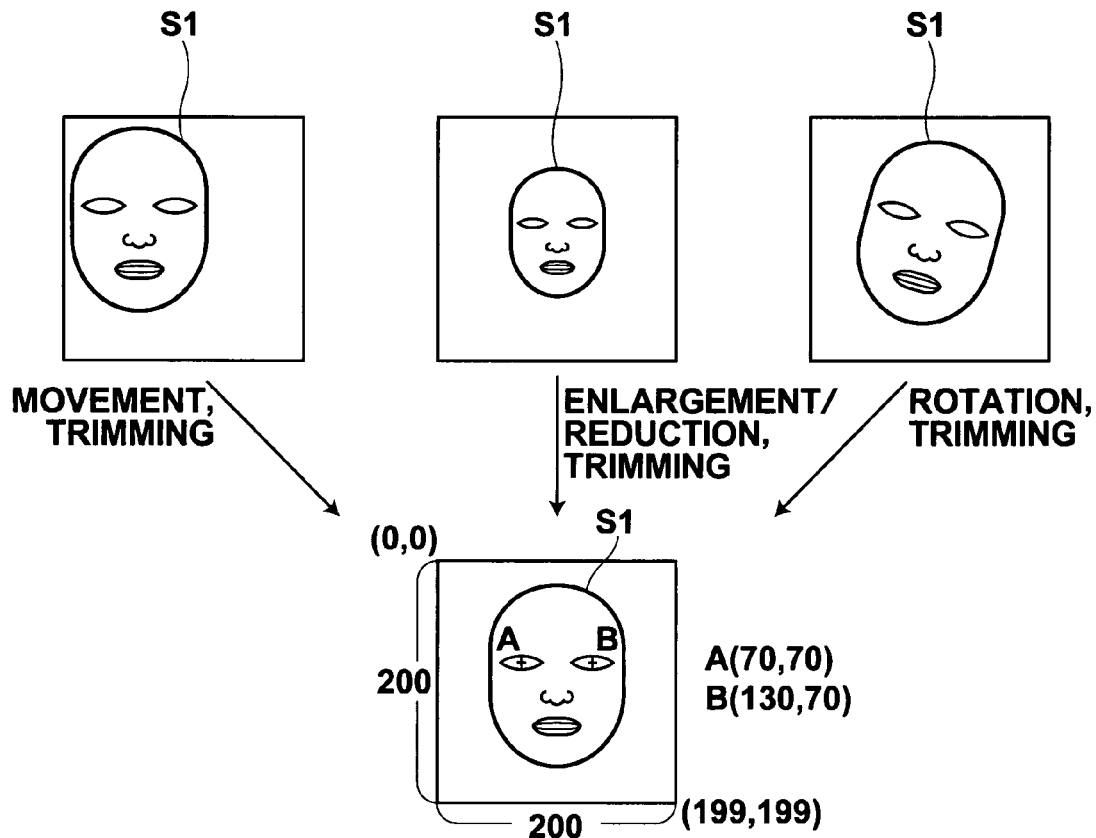
FIG. 3
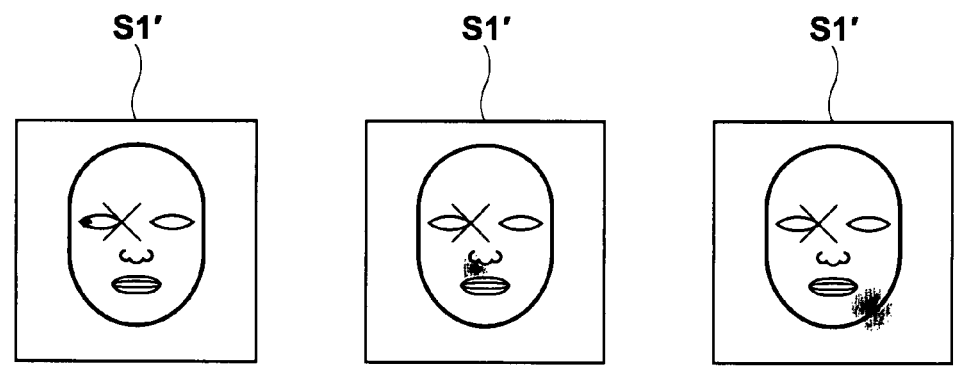
FIG. 4A  FIG. 4B  FIG. 4C

FIG. 8

WEIGHT(i,j) FUNCTION

| CHARACTERISTIC POINT Xj / CHARACTERISTIC POINT Xi | X₁ (OUTER CORNER OF LEFT EYE) | X₂ (INNER CORNER OF LEFT EYE) | X₃ (INNER CORNER OF RIGHT EYE) | X₄ (OUTER CORNER OF RIGHT EYE) | X₅ (LEFT NOSTRIL) | X₆ (RIGHT NOSTRIL) | X₇ (LEFT MOUTH CORNER) | X₈ (RIGHT MOUTH CORNER) | X₉ (UPPER LIP (MIDPOINT)) | X₁₀ (LOWER LIP (MIDPOINT)) |
|---|---|---|---|---|---|---|---|---|---|---|
| X₁ (OUTER CORNER OF LEFT EYE) |  | 0.8 | 0.6 | 0.6 | 0.4 | 0.4 | 0.1 | 0.1 | 0.1 | 0.1 |
| X₂ (INNER CORNER OF LEFT EYE) | 0.8 |  | 0.6 | 0.6 | 0.4 | 0.4 | 0.1 | 0.1 | 0.1 | 0.1 |
| X₃ (INNER CORNER OF RIGHT EYE) | 0.6 | 0.6 |  | 0.6 | 0.4 | 0.4 | 0.1 | 0.1 | 0.1 | 0.1 |
| X₄ (OUTER CORNER OF RIGHT EYE) | 0.6 | 0.6 | 0.6 |  | 0.4 | 0.4 | 0.1 | 0.1 | 0.1 | 0.1 |
| X₅ (LEFT NOSTRIL) | 0.4 | 0.4 | 0.4 | 0.4 |  | 0.8 | 0.4 | 0.4 | 0.6 | 0.6 |
| X₆ (RIGHT NOSTRIL) | 0.4 | 0.4 | 0.4 | 0.4 | 0.8 |  | 0.4 | 0.4 | 0.6 | 0.6 |
| X₇ (LEFT MOUTH CORNER) | 0.1 | 0.1 | 0.1 | 0.1 | 0.4 | 0.4 |  | 0.6 | 0.8 | 0.8 |
| X₈ (RIGHT MOUTH CORNER) | 0.1 | 0.1 | 0.1 | 0.1 | 0.4 | 0.4 | 0.6 |  | 0.8 | 0.8 |
| X₉ (UPPER LIP (MIDPOINT)) | 0.1 | 0.1 | 0.1 | 0.1 | 0.6 | 0.6 | 0.8 | 0.8 |  | 0.8 |
| X₁₀ (LOWER LIP (MIDPOINT)) | 0.1 | 0.1 | 0.1 | 0.1 | 0.6 | 0.6 | 0.8 | 0.8 | 0.8 |  |

$$P_i = \sum_{\substack{j=1 \\ j \neq i}}^{n} \sum_{t=1}^{k} \frac{1}{k'} \times weight(i,j) \times P_{ij}(x_i \mid q_{jt}).$$

WEIGHT(i,j) FUNCTION

| CHARACTERISTIC POINT Xi \ CHARACTERISTIC POINT Xj | LEFT EYE | RIGHT EYE | NOSE | LEFT MOUTH CORNER | RIGHT MOUTH CORNER |
|---|---|---|---|---|---|
| LEFT EYE | | 0.4 | 0.4 | 0.1 | 0.1 |
| RIGHT EYE | 0.4 | | 0.4 | 0.1 | 0.1 |
| NOSE | 0.25 | 0.25 | | 0.25 | 0.25 |
| LEFT MOUTH CORNER | 0.1 | 0.1 | 0.4 | | 0.4 |
| RIGHT MOUTH CORNER | 0.1 | 0.1 | 0.4 | 0.4 | |

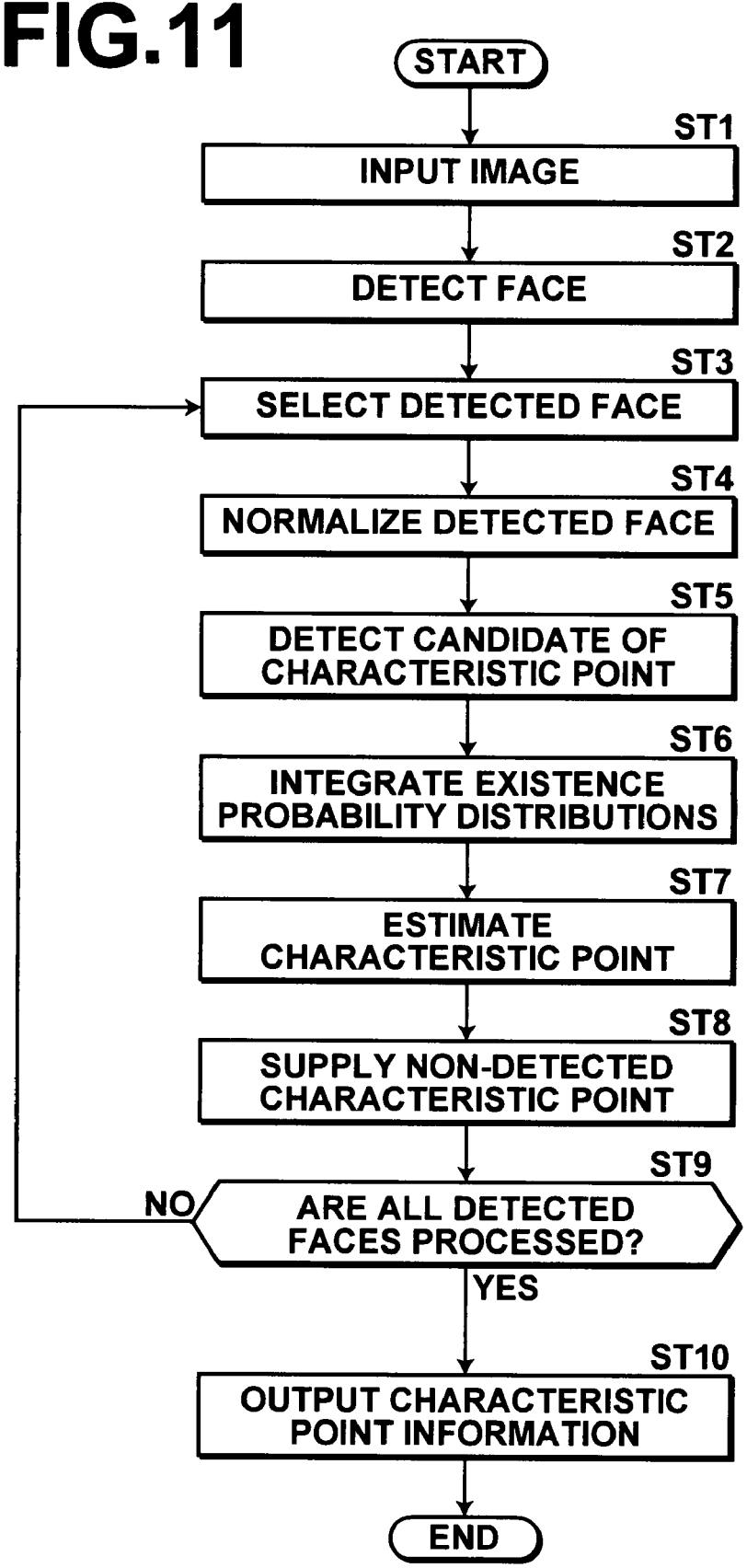

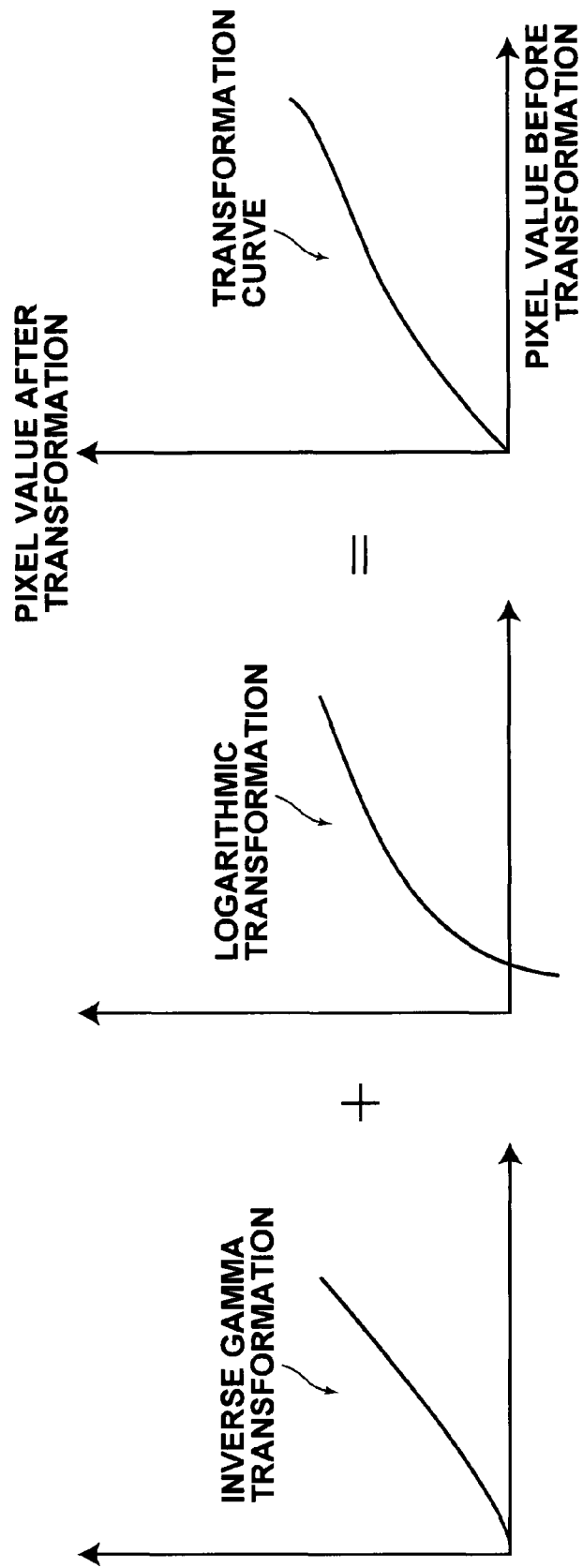

CHARACTERISTIC POINT DETECTION OF TARGET OBJECT INCLUDED IN AN IMAGE

BACKGROUND OF THE INVENTION

1. Field of the Invention

The present invention relates to a characteristic point detection method and apparatus for detecting characteristic points of a predetermined target object included in an image, and the program therefor.

2. Description of the Related Art

Methods for detecting the positions, postures, shapes, and the like of predetermined target objects included in images have been studied in various fields, and different methods are proposed as one of such methodologies. In these methods, a plurality of characteristic points representing a characteristic region of a predetermined target object is defined in advance. Then, the plurality of characteristic points is detected from a detection target image, and the position, posture, shape and the like of the predetermined target object are detected based on the positional relationship of the detected characteristic points.

For example, a target object position detection method is proposed as described, for example, in Japanese Unexamined Patent Publication No. 6 (1994)-348851. In the method, a plurality of reference characteristic points forming a target object (e.g., eyes, nose, face contour, or the like when the target object is a human face) is defined. Then, response when a specific filter is applied to the characteristic points is learned. In addition, a standard positional relationship between the characteristic points, i.e., an existence probability distribution of the center point of the target object with respect to each of the characteristic points on an image is also learned, and these learning results are stored. Thereafter, the same filter used for learning is applied to an input image to detect a plurality of candidates of the characteristic points from the response, and a comparison is made between each of the detected characteristic points and the learned standard positional relationship between the characteristic points. Then, the existence probability distributions of the center point of the face on the image are added up, and the position having a highest existence probability is determined as the center point of the target object. Here, the probability distribution is approximated by a Gaussian function.

Further, an object position detection method, which is similar to the method described in Japanese Unexamined Patent Publication No. 6 (1994)-348851, is proposed in a non-patent literature, "A Multi-Stage Approach to Facial Feature Detection", D. Cristinacce et al., In Proc. of BMVC, 2004, pp. 231-240. The method detects a plurality of characteristic points as a pair, instead of detecting a certain single point, such as the center point of an object or the like. In addition, it statistically generates existence probability distributions from multitudes of learning samples in order to determine the "standard positional relationship between characteristic points" according to real data. More specific description of the method will be provided hereinafter.

(Learning Step)

In the method, an existence probability distribution of the correct point of one characteristic point with respect to the position of another characteristic point detected by a certain characteristic point detector (having a discriminator generated by AdaBoost learning algorithm, or the like) is provided for each pair of two different characteristic points. The positional relationship between the characteristic points is represented by the existence probability distributions of a plurality of these pairs. Here, the existence probability distribution of the correct point of a characteristic point $X_i$ (coordinate $x_i$) with respect to a detector output coordinate $x_j$ of a characteristic point $X_j$ is defined as $P_{ij}(x_i|x_j)$. Note that $P_{ij}$ is represented by a two-dimensional histogram in actual implementation.

In order to obtain the existence probability distribution $P_{ij}$, first, target object detection is performed on a training image set (several thousands of images with correct coordinates of characteristic points of a target object inputted therein), and the images are normalized so that the target objects locate at a reference position. FIG. 3 illustrates an example case where the target object is a human face, and faces are detected from images, then the images are normalized such that the faces locate in the center thereof with a predetermined size.

Then, a characteristic point $X_i$ is detected by a characteristic point detector $D_i$ from the normalized images, and the difference between the coordinate $x_i$ of the characteristic point $X_i$ and the correct coordinate $x_j$ of another characteristic point $X_j$ is compared for each pair of two different characteristic points, the characteristic point $X_i$ and the another characteristic point $X_j$, and the results are added up. FIGS. 4A to 4C illustrate examples of existence probability distributions $P_{ij}$ obtained through the learning described above. FIGS. 4A to 4C are examples where the target objects are human faces, in which the positions of the characteristic points detected by the characteristic point detectors are denoted by "x", and the existence probability distributions of target characteristic points are represented by shading on the images. Here, the position having a higher existence probability is indicated by denser shading. FIG. 4A illustrates an existence probability distribution of the point of the outer corner of the left eye with respect to the position of the point of the inner corner of the left eye detected by the left eye inner corner detector. FIG. 4B illustrates an existence probability distribution of the point of the left nostril with respect to the position of the inner corner of the left eye. FIG. 4C illustrates an existence probability distribution of the point of the right mouth corner with respect to the position of the inner corner of the left eye.

(Detection Step)

A target object is detected from a detection target image, and a normalized image that includes the target object is obtained. Then, processing is performed on the normalized image for detecting candidates of characteristic points, and sum of the existence probability distributions of each characteristic point that may be estimated from the candidate of another characteristic point is obtained, thereby the point having a highest existence probability is estimated and selected as the true point of the characteristic point. The point that may be estimated as the true point of a characteristic point may be expressed by the following formula.

$$\hat{x}_i = \mathrm{argmax} \sum_{j=1}^{n} \sum_{t=1}^{k} P_{ij}(x_i|q_{jt})$$

Where, $\hat{x}_i$ (left-hand side) is the position coordinate of the point that may be estimated as the true point of the characteristic point; $P_{ij}(x_i|q_{jt})$ is the existence probability distribution of the characteristic point $X_i$ (position coordinate $x_i$) with respect to the coordinate $q_{jt}$ of the $t^{th}$ candidate of the characteristic point $X_j$; "k" is the number of candidates of the characteristic point $X_j$; and "n" is the number of defined characteristic points.

When detecting the position of a certain characteristic point, the method described above does not rely on the output of the single characteristic point detector assigned to detect the characteristic point. Instead, each of a plurality of characteristic point detectors estimates the positions of other characteristic points with each other, and thereby the method may provide more excellent detection capabilities than the capabilities of a single detector.

In the object position detection method proposed in the non-patent literature, however, the departure from the average position becomes greater for a characteristic point located farther from the position of the reference characteristic point if a relatively large change occurs in the posture of the target object, and the reliability of the existence probability distribution thereof is degraded. FIGS. 14A to 14C illustrate that the departure from the average position becomes greater for a characteristic point located farther from the position of the reference characteristic point, taking a face as an example target object. FIGS. 14A to 14C illustrate the average position of each characteristic point and the position of each component of actual face superimposed thereon with the position of the characteristic point of the left eye fixed as the reference when the orientations of the faces are front, left, and downward respectively. These drawings illustrate that the farther the location of other characteristic points from the position of the characteristic point of the left eye, the greater the amounts of departure from the average positions of the other characteristic points.

Further, if the density of characteristic points is biased, like whereas a certain component of a target object has three characteristic points, other components have only one characteristic point, the influence from the characteristic point locating at a specific fixed location becomes great, thereby the balance of the positions of characteristic points contributing to the integration of existence probability distributions of a certain characteristic point is disturbed. As a result, a candidate, which is actually not the characteristic point, is more likely to be incorrectly selected as the true point of the characteristic point. FIG. 15, taking a face as an example target object, illustrates that many characteristic points are concentrated on a specific face component. As illustrated in the drawing, the eyes have more number of characteristic points than the other face components, so that the influence from the characteristic points locating in specific fixed positions, the "eye positions" becomes great. Thereby, strong binding force is exerted centered on the eye positions, and the binding force from the other positions is weakened.

SUMMARY OF THE INVENTION

The present invention has been developed in view of the circumstances described above, and it is an object of the present invention to provide a characteristic point detection method, apparatus, and the program therefor capable of detecting characteristic points of a predetermined target object included in an image reliably and accurately by minimizing the effect arising from variations in the posture of the target object in the characteristic point detection process in which a plurality of existence probability distributions of a single characteristic point, statistically determined from the positions of candidates of other characteristic points, is obtained and integrated, and the position of the single characteristic point is estimated based on the magnitude of the existence probabilities in the integrated existence probability distribution.

The characteristic point detection method according to an embodiment of the present invention is a method that includes the steps of:

detecting a candidate of each of a plurality of predefined target characteristic points of a predetermined object from a detection target image;

obtaining an existence probability distribution for at least one of the plurality of predefined target characteristic points with respect to each of the detected candidates of the other predefined target characteristic points, the existence probability distribution being an existence probability distribution of the target characteristic point that indicates the existence probabilities thereof when the position of the detected candidate of another characteristic point is taken as a reference characteristic point, using an existence probability distribution statistically obtained in advance for each combination of two different characteristic points of the plurality of predefined target characteristic points, the existence probability distribution being an existence probability distribution of one of the characteristic points on an image when the position of the other characteristic point is taken as a reference characteristic point, and integrating the obtained existence probability distributions; and estimating the true point of the target characteristic point on the detection target image based on the magnitude of the existence probabilities of the target characteristic point in the integrated existence probability distribution thereof, wherein the integration step performs the integration by weighting each of the obtained existence probability distributions according to the positional relationship between the reference characteristic point and the target characteristic point.

Preferably, in the characteristic point detection method described above, the integration step is a step that performs the integration by normalizing the existence probability distributions obtained with respect to the same reference characteristic point by the number thereof.

In the characteristic point detection method described above, the integration step may be a step that performs the integration according to the following formula:

$$P_i = \sum_{\substack{j=1 \\ j \neq i}}^{n} \sum_{t=1}^{k} \frac{1}{k'} \times \text{weight}(i, j) \times P_{ij}(x_i | q_{jt})$$

where: $P_i$ is the integrated existence probability distribution of the characteristic point $X_i$; $x_i$ is the position coordinate of the characteristic point $X_i$; $q_{jt}$ is the position coordinate of $t^{th}$ candidate $Q_{jt}$ of the characteristic point $X_j$; $P_{ij}(x_i|q_{jt})$ is the existence probability distribution of the characteristic point $X_i$ when the position coordinate $q_{jt}$ of the candidate $Q_{jt}$ is taken as a reference; "k" and "k'" are the number of candidates of the characteristic point $X_j$; weight (i, j) is the weighting factor for the existence probability distribution $P_{ij}(x_i|q_{jt})$; and "n" is the number of defined target characteristic points.

Preferably, in the characteristic point detection method described above, the integration step is a step that performs the integration by allocating a weighting factor to each of the obtained existence probability distributions such that the greater the distance between the reference characteristic point and the target characteristic point, the smaller the weighting factor.

Preferably, in the characteristic point detection method described above, the plurality of predefined target characteristic points are the characteristic points grouped according the positions thereof on the predetermined object; and the integration step performs the integration only for the existence probability distribution of the target characteristic point which belongs to a different group from that of the reference characteristic point.

Further, in the characteristic point detection method described above, the estimation step may be a step that estimates the point of a position having a highest existence probability in the integrated existence probability distribution of the target characteristic point as the true point thereof.

Still further, in the characteristic point detection method described above, the detection step may be a step that calculates a certainty value that indicates a probability that the image of a discrimination target region of the detection target image includes the target characteristic point, and determines the object represented by the image of the discrimination region to be the candidate of the target characteristic point when the certainty value is greater than or equal to a predetermined threshold value; and the estimation step may be a step that estimates the true point of the target characteristic point based on the magnitude of the certainty value of the candidate of the target characteristic point in addition to the magnitude of the existence probabilities of the target characteristic point in the integrated existence probability distribution thereof.

Here, the estimation step may be a step that estimates a candidate having a highest certainty value among the candidates included in a predetermined region represented by the point of a position having a highest existence probability in the integrated existence probability distribution of the target characteristic point, or a candidate whose position in the integrated existence probability distribution of the target characteristic point corresponds to a highest existence probability among the candidates as the true point thereof.

The characteristic point detection apparatus according to an embodiment of the present invention is an apparatus that comprises:

a characteristic point candidate detection means for detecting a candidate of each of a plurality of predefined target characteristic points of a predetermined object from a detection target image;

an existence probability distribution integration means for obtaining an existence probability distribution for at least one of the plurality of predefined target characteristic points with respect to each of the detected candidates of the other predefined target characteristic points, the existence probability distribution being an existence probability distribution of the target characteristic point that indicates the existence probabilities thereof when the position of the detected candidate of another characteristic point is taken as a reference characteristic point, using an existence probability distribution statistically obtained in advance for each combination of two different characteristic points of the plurality of predefined target characteristic points, the existence probability distribution being an existence probability distribution of one of the characteristic points on an image when the position of the other characteristic point is taken as a reference characteristic point, and integrating the obtained existence probability distributions; and a characteristic point estimation means for estimating the true point of the target characteristic point on the detection target image based on the magnitude of the existence probabilities of the target characteristic point in the integrated existence probability distribution thereof, wherein the existence probability distribution integration means performs the integration by weighting each of the obtained existence probability distributions according to the positional relationship between the reference characteristic point and the target characteristic point.

Preferably, in the characteristic point detection apparatus described above, the existence probability distribution integration means is a means that performs the integration by normalizing the existence probability distributions obtained with respect to the same reference characteristic point by the number thereof.

In the characteristic point detection apparatus described above, the existence probability distribution integration means may be a means that performs the integration according to the following formula:

$$P_i = \sum_{\substack{j=1 \\ j \neq i}}^{n} \sum_{t=1}^{k} \frac{1}{k'} \times \text{weight}(i, j) \times P_{ij}(x_i | q_{jt})$$

where: $P_i$ is the integrated existence probability distribution of the characteristic point $X_i$; $x_i$ is the position coordinate of the characteristic point $X_i$; $q_{jt}$ is the position coordinate of $t^{th}$ candidate $Q_{jt}$ of the characteristic point $X_j$; $P_{ij}(x_i|q_{jt})$ is the existence probability distribution of the characteristic point $X_i$ when the position coordinate $q_{jt}$ of the candidate $Q_{jt}$ is taken as a reference; "k" and "k'" are the number of candidates of the characteristic point $X_i$; weight (i, j) is the weighting factor for the existence probability distribution $P_{ij}(x_i|q_{jt})$; and "n" is the number of defined target characteristic points.

Preferably, in the characteristic point detection apparatus described above, the existence probability distribution integration means is a means that performs the integration by allocating a weighting factor to each of the obtained existence probability distributions such that the greater the distance between the reference characteristic point and the target characteristic point, the smaller the weighting factor.

Preferably, in the characteristic point detection apparatus described above, the plurality of predefined target characteristic points are the characteristic points grouped according the positions thereof on the predetermined object; and the existence probability distribution integration means is a means that performs the integration only for the existence probability distribution of the target characteristic point which belongs to a different group from that of the reference characteristic point.

Further, in the characteristic point detection apparatus described above, the characteristic point estimation means estimates the point of a position having a highest existence probability in the integrated existence probability distribution of the target characteristic point as the true point thereof.

Still further, in the characteristic point detection apparatus described above, the characteristic point candidate detection means may be a means that calculates a certainty value that indicates a probability that the image of a discrimination target region of the detection target image includes the target characteristic point, and determines the object represented by the image of the discrimination region to be the candidate of the target characteristic point when the certainty value is greater than or equal to a predetermined threshold value; and the characteristic point estimation means may be a means that estimates the true point of the target characteristic point based on the magnitude of the certainty value of the candidate of the target characteristic point in addition to the magnitude of the existence probabilities of the target characteristic point in the integrated existence probability distribution thereof.

Here, the characteristic point estimation means may be a means that estimates a candidate having a highest certainty value among the candidates included in a predetermined region represented by the point of a position having a highest existence probability in the integrated existence probability distribution of the target characteristic point, or a candidate whose position in the integrated existence probability distribution of the target characteristic point corresponds to a highest existence probability among the candidates as the true point thereof.

The referent of "existence probability distribution of the target characteristic point" as used herein means probability distributions for a plurality of positions on an image indicating existence probabilities of the target characteristic point at the respective positions on the image.

The referent of "integrates the existence probability distributions" as used herein means that existence probability distributions of the positions corresponding to each other on an image are integrated to obtain a new existence probability distribution. Here, the integration may be performed by either addition or multiplication.

In the present invention, if the point of a position having a highest existence probability in the integrated existence probability distribution of the target characteristic point among the candidates is estimated as the true point thereof, it is preferable that only the existence probabilities corresponding to the positions of the candidates of the characteristic point be integrated, and existence probabilities corresponding to other positions be not integrated.

The referent of "predetermined region represented by the point of a position having a highest existence probability" as used herein means a region having a predetermined size defined with the point as the approximate center, approximate center of gravity, or approximate midpoint. The region may have a shape of circle or polygon, such as rectangle or the like.

In the present invention, the predetermined object may be, for example, a human face, an automobile, an animal, and the like.

The characteristic points of a predetermined object detected by the method and apparatus of the present invention may be used for authenticating whether the predetermined object is a specific object, or discriminating face expressions and the like if the predetermined object is a human face, as well as for postural recognition of the predetermined object.

Further, the weighting factors may be serial values or stepwise changed values according to the positional relationship described above.

The characteristic point detection method may be provided as a program for causing a computer to execute the method.

According to the characteristic point detection method and apparatus of the present invention, for each combination of two different characteristic points of a plurality of predefined target characteristic points, an existence probability distribution is obtained in advance, which is an existence probability distribution of one of the characteristic points on an image when the position of the other characteristic point is taken as a reference characteristic point, statistically obtained through a plurality of samples or the like. Then, a candidate of each of the plurality of target characteristic points is detected from a detection target image. Thereafter, using the existence probability distributions obtained in advance, an existence probability distribution for at least one of the plurality of target characteristic points is obtained with respect to each of the other target characteristic points or each of the detected candidates thereof, which is an existence probability distribution of the target characteristic point that indicates the existence probabilities thereof when the position of the detected candidate of another characteristic point is taken as a reference characteristic point, and the obtained existence characteristic distributions are integrated. Then, based on the magnitude of the existence probabilities in the integrated existence probability distribution of the target characteristic point, the true point thereof on the detection target image is estimated. Here, when integrating the existence probability distributions, a weighting factor is allocated to each of the obtained existence probability distributions according to the positional relationship between the reference characteristic point and the target characteristic point, and the obtained probability distributions are integrated using the weighting factors. That is, when performing the integration, a low contribution rate is allocated to the existence probability distribution of the target characteristic point located farther from the position of the reference characteristic point, in consideration of likelihood that the farther the location of the target characteristic point from the reference characteristic point, the greater will be the departure from the average position of the target characteristic point, and hence the lower will be the reliability of the existence probability distribution of such characteristic point. Therefore, the influence arising from variations in the posture of the object included in the detection target image may be minimized, and the target characteristic points may be detected accurately and reliably.

BRIEF DESCRIPTION OF THE DRAWINGS

FIG. 3 is a drawing illustrating a face normalization process.

FIGS. 4A to 4C are drawings illustrating examples of existence probability distributions of the positions of other characteristic points when a single characteristic point is taken as a reference.

FIG. 8 is a drawing illustrating examples of weighting factors used for integrating existence probability distributions of characteristic points (first one).

FIG. 11 is a flowchart illustrating a process performed in the present embodiment.

FIG. 17 is a drawing illustrating an example of transformation curve of pixels used for illumination normalization (overall normalization).

DESCRIPTION OF THE PREFERRED EMBODIMENTS

Hereinafter, an exemplary embodiment of the present invention will be described with reference to accompanying drawings.

Figure 1:
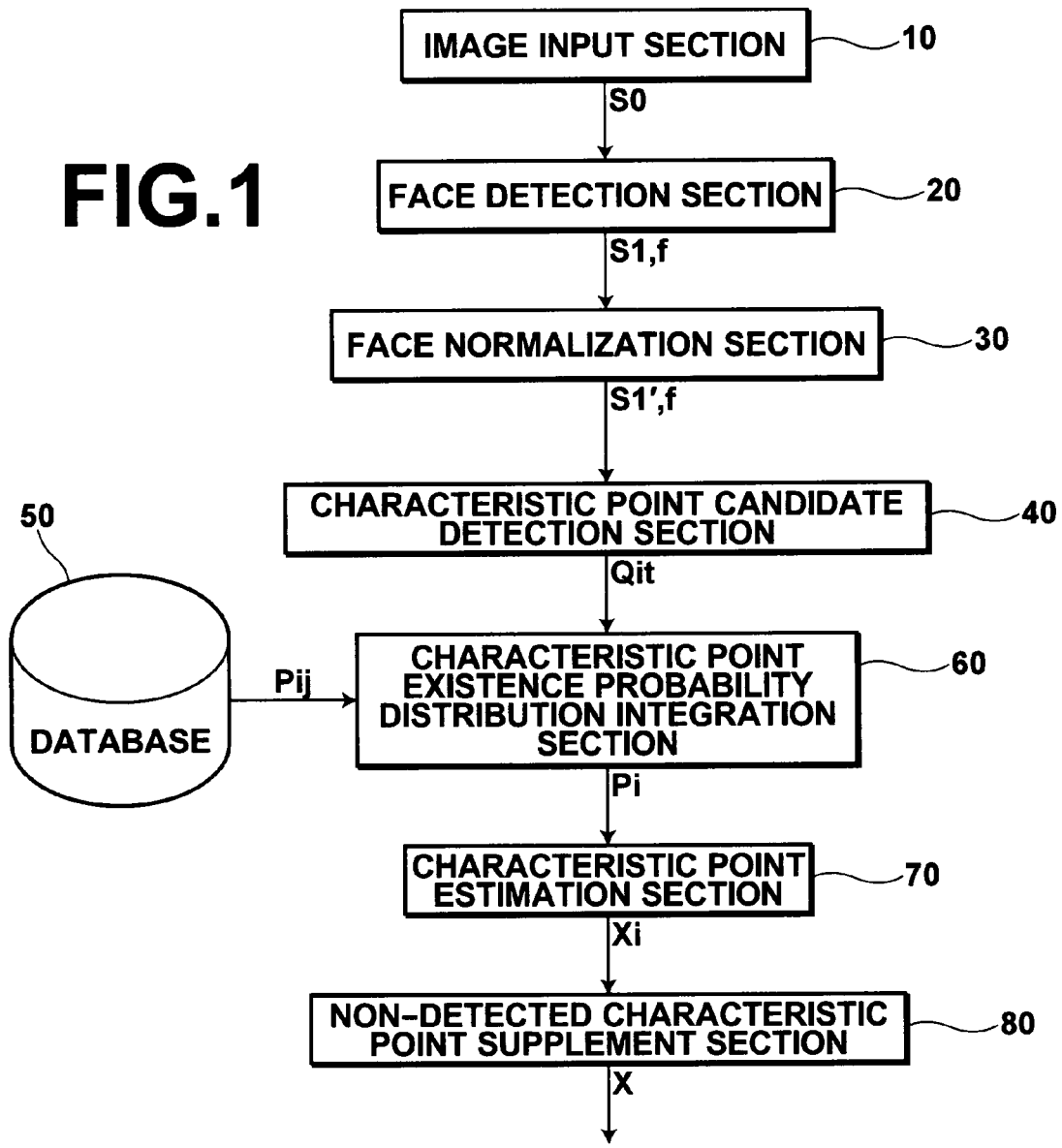
FIG. 1 is a block diagram of a face characteristic point detection system according to an embodiment of the present invention, illustrating the construction thereof.

FIG. 1 a block diagram of a face characteristic point detection system according to an embodiment of the present invention, illustrating the construction thereof. The face characteristic point detection system is a system that detects a human face from an image and further detects characteristic points of the detected face. The system is realized by executing a processing program, which is stored in an auxiliary storage, on a computer (e.g., personal computer, or the like). The image processing program is recorded on an information recording medium, such as CD-ROM or the like, or distributed through a network, such as the Internet or the like, and installed on the computer. The referent of image data as used herein means data representing an image, and hereinafter these terms are used interchangeably.

As shown in FIG. 1, the face characteristic point detection system of the present embodiment includes: an image input section 10 for accepting input of an image S0, which is a face detection target image (hereinafter, the image S0 is also referred to as "input image S0"); a face detection section (face detection means) 20 for detecting each face S1 included in the input image S0, and obtains position information of the eyes of each face S1 and information of face orientation "f" thereof (hereinafter, the face image S1 is also referred to as "detected face image S1"); a face normalization section 30 for obtaining a normalized face image S1' of the face S1 by cutting out an image, which has a predetermined size and includes the face S1 normalized in the relative size and position, from the input image S0; and a characteristic point candidate detection section (characteristic point candidate detection means) 40 for calculating a detection score SCD that indicates a probability that a characteristic point is included in the approximate center of the image of a determination target region specified on the normalized face image S1', and detecting a candidate $Q_{jt}$ of each face characteristic point $X_i$ based on a threshold discrimination of the detected score SCD. The system further includes: a database (storage means) 50 having stored therein each existence probability distribution $P_{ij}$ of each face characteristic point $X_j$ when a position $x_i$ of another face characteristic point $X_i$ is taken as a reference, which is statistically obtained in advance; a characteristic point existence probability distribution integration section (existence probability distribution integration means) 60 for obtaining an existence probability distribution $P_{ij}(x_i|Q_{jt})$ of each characteristic point $X_i$ on the input image S0, when each position coordinate $q_{jt}$ of each candidate $Q_{jt}$ of another characteristic point $X_j$ is taken as a reference, using the existence probability distributions $P_{ij}$ stored in the database 50, and obtaining an integrated existence probability distribution $P_i$ by integrating all of the obtained existence probability distributions; a characteristic point estimation section (characteristic point estimation means) 70 for estimating the true point of each characteristic point $X_i$ from the candidates $Q_{jt}$ of each characteristic point $X_i$ based on the magnitude of existence probabilities in the integrated existence probability distribution $P_i$ of each characteristic point $X_i$, and the magnitude of detection score SCD when a candidate $Q_{jt}$ of the characteristic point $X_i$ is detected; and a non-detected characteristic point supplement section 80 for supplying the position of a non-detected characteristic point among the defined characteristic points Xi through analogical estimation based on the positions of detected characteristic points.

The image input section 10 accepts an image S0, which is a face detection target image, inputted by the user, and stores it in a not-shown memory. The user inputs, for example, a snapshot image obtained by a digital camera or the like through the image input section 10.

The face detection section 20 reads out the input image S0 stored in the memory, and detects all of the faces S1 included in the image. More specifically, it detects the positions of the eyes of each face S1 included in the input image S0, as well as the orientation "f" of the face.

Here, as the method for detecting the positions of the eyes of the face S1, the target object discrimination method disclosed in Japanese Unexamined Patent Publication No. 2005-108197 is used. The target object discrimination method is a method for detecting a face and accurately detecting the positions of the eyes of the image included in the image using a discriminator learned by a machine learning method known as AdaBoost. In the method, a characteristic amount of an image of discrimination target region is calculated, then a determination is made whether a face is included in the image of discrimination target region based on the calculated characteristic amount, and with reference to a first reference data generated through learning of characteristic amounts of a plurality of face sample images normalized in the positions of the eyes with a predetermined tolerance and a plurality of non-face sample images, and if a face is included, the positions of the eyes of the face included in the image are discriminated with reference to a second reference data generated through learning of characteristic amounts of a plurality of face sample images normalized in the positions of the eyes with a tolerance which is smaller than the predetermined tolerance.

The discriminator discriminates a face having an orientation substantially identical to the orientation of faces of face sample images provided for learning, so that if a plurality of different types of discriminators is generated through learning using a plurality of different types of face sample image groups provided for each face orientation, and face detections are performed using the plurality of different types of discriminators, faces S1 having different orientations may be detected, and the positions of the eyes and orientation "f" of the face may be detected at the same time.

Note that a template matching method may also be used as the method for detecting the face S1, other than the method described above. Here, the positions of the eyes of a detected face S1 may be obtained by defining the positions corresponding to the positions of the eyes of the face on a plurality of templates having different face orientations in advance, or the like.

The face normalization section 30 obtains a normalized face image S1' by cutting out an image, which has a predetermined size and includes a face S1 normalized such that the positions of the eyes locate at predetermined reference positions, from an input image S0 using the input image S0 (gray image) and information of the positions of the eyes of the detected face S1. FIG. 3 illustrates a normalization process in which normalized images S1' are obtained by enlarging/reducing or rotating input images S0 as required, and then performing appropriate trimmings. In the present embodiment, the face S1 is normalized such that the center positions of the eyes of the face S1 locate at a position A (70, 70) and a position B (130, 70) respectively assuming that the coordinate of the upper left most pixel is (0, 0) and the coordinate of the bottom light most pixel is (199, 199), with an image size of 200×200 pixels. If the orientation "f" of the face S1 is at an angle, for example, 45 degrees, the normalization is performed such that the face position is shifted upward by 20 pixels, and the center positions of the eyes of the face S1 locate at A(70, 50) and B (130, 50) respectively.

The characteristic point candidate detection section 40 calculates a detection score SCD that indicates a probability that a characteristic point is included in the approximate center of the image of a determination target region specified on the normalized face image S1', and detects a candidate $Q_{i,t}$ of each face characteristic point $X_i$ by determining that an object represented by the image of the determination target region is the characteristic point thereof if the detection score SCD is greater than or equal to a predetermined threshold value.

Figure 2:
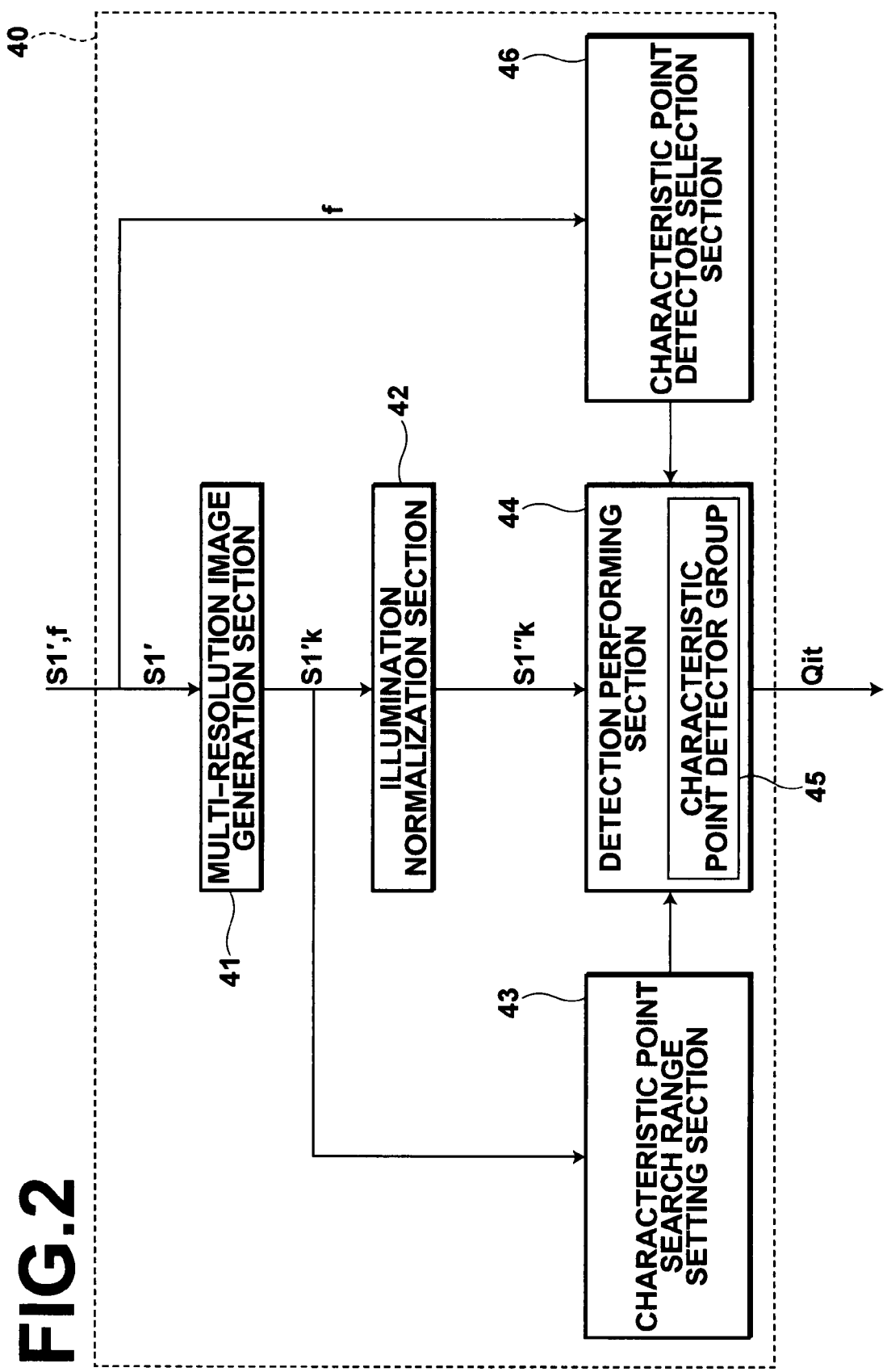
FIG. 2 is a block diagram of the characteristic point candidate detection section 40 shown in FIG. 1, illustrating the construction thereof.

FIG. 2 illustrates the construction of the characteristic point candidate detection section 40. As shown in the drawing, the characteristic point candidate detection section 40 includes: a multi-resolution image generation section 41; an illumination normalization section 42; a characteristic point search range setting section 43; a detection performing section 44 that includes a characteristic point detector group 45; and a characteristic point detector selection section 46.

The characteristic point detector group 45 includes a plurality of different types of characteristic point detectors $D_i$, each provided for each type of target characteristic point $X_i$. Each characteristic point detector $D_i$ accurately detects the position of a characteristic point using a plurality of discriminators learned through a machine learning method called AdaBoost as described for example, in Japanese Unexamined Patent Publication No. 2005-108197.

The discriminator described above calculates a discrimination point that indicates the probability that the image of a discrimination target region includes the characteristic point based on the characteristic amount calculated from the image of the discrimination target region, and with reference to a reference data generated through learning of characteristic amounts of a plurality of sample images of characteristic points normalized such that the position of a specific characteristic point locates at the approximate center thereof with a predetermined tolerance and a plurality of sample images of non-characteristic point. By setting an appropriate threshold value, a determination may be made whether a discrimination target image includes a specific characteristic point at the approximate center thereof through the threshold discrimination of the discrimination point.

Figure 16:
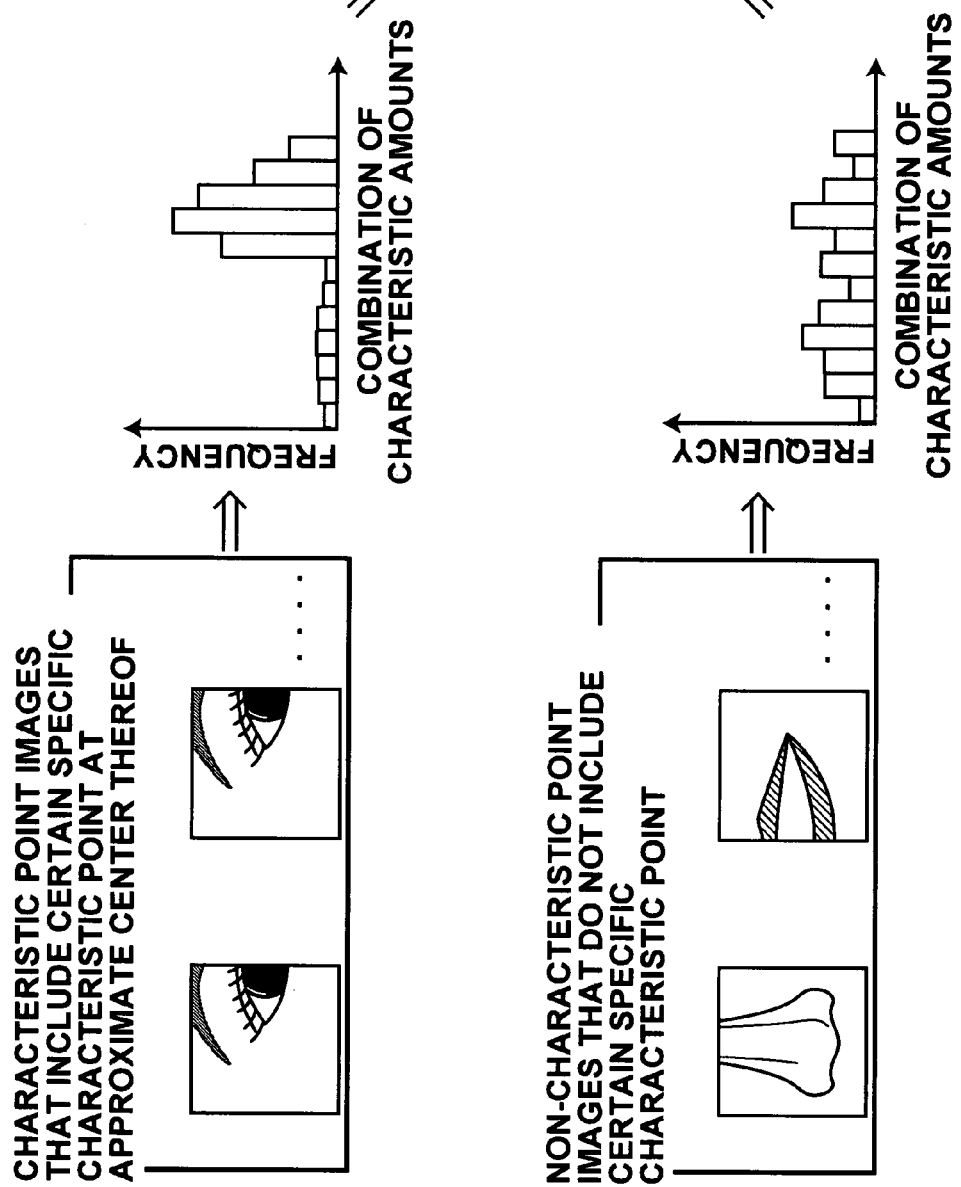
FIG. 16 is a drawing illustrating a method in which a discriminator is derived.

The generation of a discriminator of a specific characteristic point will now be described briefly with reference to FIG. 16. First, for all of the sample images of characteristic points that include a specific characteristic point at the approximate center thereof, a plurality of types of characteristic amounts are calculated and combinations of the characteristic amounts are obtained to create a histogram thereof. Similarly, for all of the sample images of non-characteristic point, combinations of the same plurality of types of characteristic amounts are obtained to create a histogram thereof. Logarithms or the like of the ratios of the frequencies in the two histograms are represented by the rightmost histogram illustrated in FIG. 16, which is employed as the discriminator. Hereinafter, each value in the vertical axis (bin) of the histogram employed as the discriminator is referred to as a discrimination point. According to the discriminator, images that have distributions of the characteristic amounts corresponding to positive discrimination points therein are highly likely to be the images that include the specific characteristic point at the center thereof. The probability increases with an increase in the absolute values of the discrimination points. In the mean time, images that have distributions of the characteristic amounts corresponding to negative discrimination points are highly likely not the characteristic point. Again, the probability increases with an increase in the absolute value of the negative discrimination points.

A plurality of such discriminators are provided for each combination of the characteristic amounts, and a discriminator, which is effective in discriminating whether an image includes the specific characteristic point at the center thereof is selected through a predetermined algorithm. As for the predetermined algorithm, for example, the method described below may be employed. Initially, each of the sample images of characteristic points and sample images of non-characteristic points are equally given a weighting of 1 in advance. Then, discriminations are performed by each of the discriminators whether each of the sample images is an image that includes the specific characteristic point at the center thereof to obtain weighted percentages of correct discriminations of each of the discriminators. Then, the weighted percentages of correct discriminations provided by each of the discriminators are compared, and the discriminator having the highest weighted percentage of correct discriminations is selected. Thereafter, the weighting of each of the sample images having low percentages of correct discriminations by the discriminators is set greater than the current values, and discriminations are performed again by each of the discriminators to obtain the weighted percentages of correct discriminations of each of the discriminators, and the discriminator having the highest weighted percentage of correct discriminations is selected. By repeating the process described above, discriminators effective for the discrimination are selected one by one. Please refer to Japanese Unexamined Patent Publication No. 2005-108197 for more detailed description of the algorithm described above.

The characteristic point detector $D_i$ specifies a determination target region on a normalized resolution image $S1''_k$, to be described later, and calculates discrimination points using the selected effective discriminators, with the image of the specified determination target region as the image of the discrimination target region to obtain the total of the calculated discrimination points as a detection score SCD. Then, a determination is made whether the detection score SCD is greater than or equal to a predetermined threshold value, and if it is greater than the threshold value, the image of the determination target region is determined to include the specific characteristic point at the center thereof. That is, the center position thereof is detected as the position of a candidate of the specific characteristic point.

As for the sample images of characteristic points used for the learning of the discriminators, for example, several tens of thousands of samples are provided in total, including several thousands of base images of characteristic points having different patterns, and variations thereof obtained through enlargement/reduction, rotation, and aspect conversion of the base images. The resolution of each patch is 24×24 pixels, and the learning is performed through the AdaBoost learning algorithm using the output value of a Harr-like filter as the characteristic amount.

The discriminator discriminates a characteristic point which is the same type of characteristic point included in images used for learning, so that if a plurality of different types of discriminators is generated through learning using a plurality of different types of characteristic point sample image groups, each having a different type of characteristic point, and characteristic points are detected using the plurality of different types of discriminators, the positions $q_{it}$ of candidates of the respective types of characteristic points $X_i$ may be detected.

In the present embodiment, if the orientation "f" of a detected face S1 is close to the front, the following ten different types of characteristic points are used as the respective characteristic points $X_i$: outer corner of left eye ($X_1$); inner corner of left eye ($X_2$); inner corner of right eye ($X_3$); outer corner of right eye ($X_4$); left nostril ($X_5$); right nostril ($X_6$); left mouth corner ($X_7$); right mouth corner ($X_8$); midpoint of upper lip ($X_9$); and midpoint of lower lip ($X_{10}$). If the orientation "f" of a detected face S1 is close to an angle of 45 degrees, the following seven different types of characteristic points are used as the respective characteristic points $X_i$: outer corner of left eye ($X_1$); inner corner of left eye ($X_2$); inner corner of right eye ($X_3$); outer corner of right eye ($X_4$); nose tip ($X_{11}$); left mouth corner ($X_7$); and right mouth corner ($X_8$). Accordingly, eleven different types of discriminators are provided. Namely, the discriminators for outer corner of left eye, inner corner of left eye, inner corner of right eye, outer corner of right eye, left nostril, right nostril, left mouth corner, right mouth corner, midpoint of upper lip, midpoint of lower lip, and nose tip.

Figure 6:
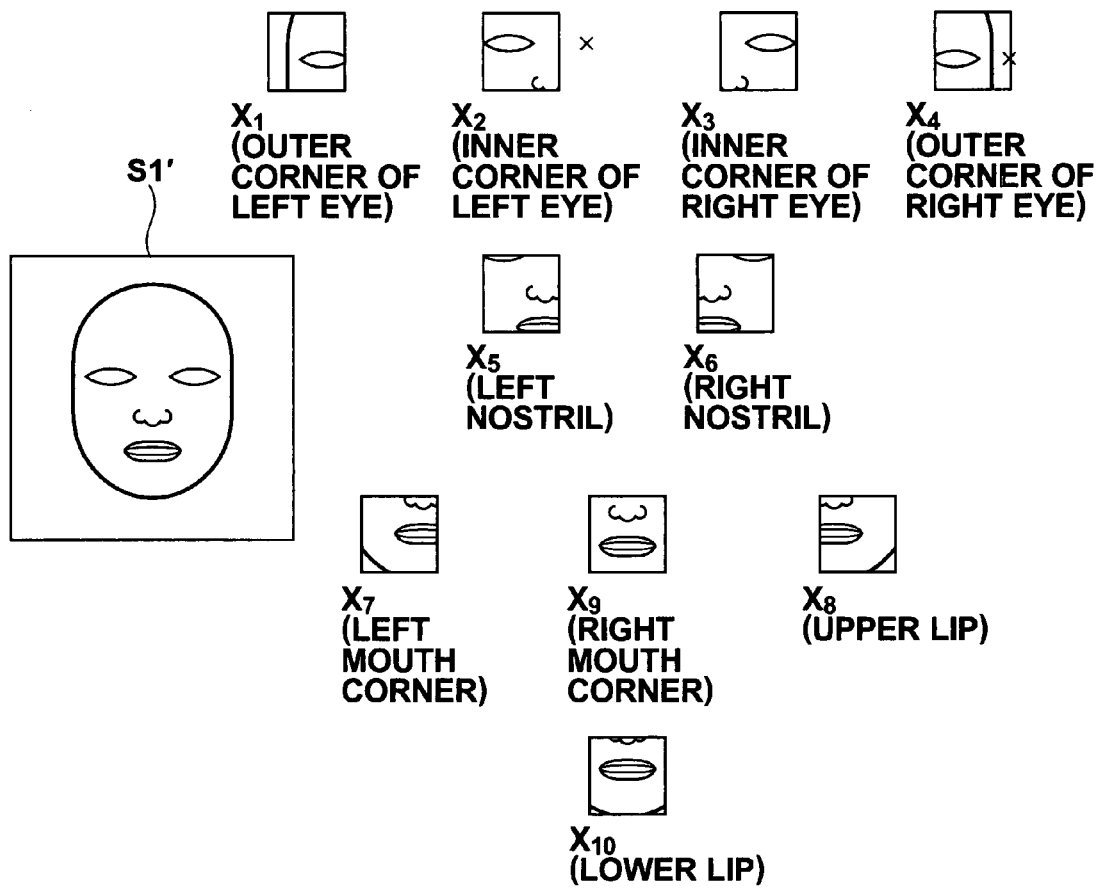
FIG. 6 is a drawing illustrating examples of the sample images of characteristic points used for learning a discriminator included in a characteristic point detector.

FIG. 6 illustrates examples of the sample images of characteristic points used for the discriminators included in each characteristic point detector, which include the following ten different types: outer corner of left eye ($X_1$); inner corner of left eye ($X_2$); inner corner of right eye ($X_3$); outer corner of right eye ($X_4$); left nostril ($X_5$); right nostril ($X_6$); left mouth corner ($X_7$); right mouth corner ($X_8$); midpoint of upper lip ($X_9$); and midpoint of lower lip ($X_{10}$) for a front-oriented face.

Figure 5:
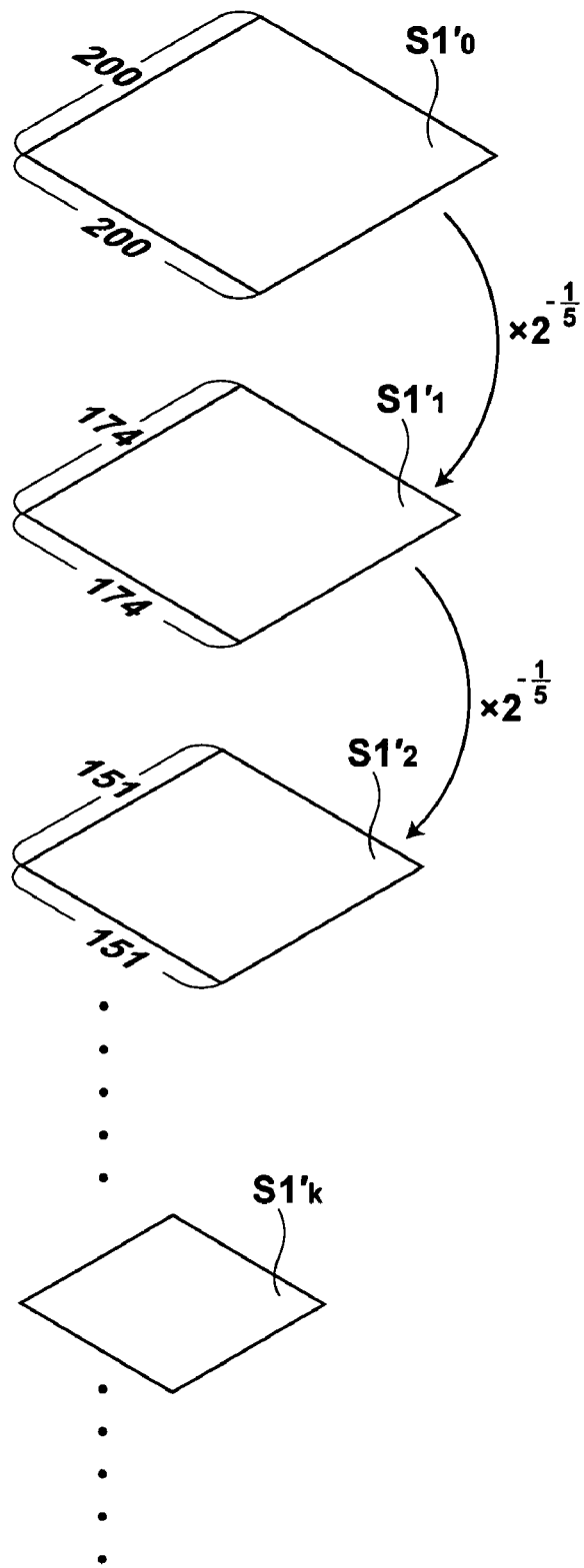
FIG. 5 is a drawing illustrating a multi-resolutioning process.

Note that a template matching method may also be used as the method for detecting the characteristic point $X_i$, other than the method described above. Here, the positions of the characteristic points may be obtained by defining the positions corresponding to the positions of the characteristic points on a plurality of templates having different types of characteristic points in advance, or the like. As shown in FIG. 5, the multi-resolution image generation section 41 generates reduced images (resolution images) $S1'_k$ in decrements of $2^{-1/5}$ with respect to the normalized face image S1', which is an image with a 200×200 pixel size. The reason for providing resolution images of the normalized face image S1' is to absorb variations in the size of the face components that may arise from the difference in the accuracy of the positions of the eyes at the time of face normalization or face orientations, or personal differences, by performing detections of candidates of characteristic points on a plurality of generated images having different resolutions, in which candidates of characteristic points are tried to be detected on the plurality of images with the gradually varied face components in a stepwise manner, thereby candidates of characteristic points may be detected reliably.

The illumination normalization section 42 performs normalization on each resolution image such that the contrast thereof becomes appropriate for detecting candidates of characteristic points, and thereby the normalized resolution image $S1''_k$ is obtained.

The normalization process described above is a process in which the contrast of the resolution image is changed to a predetermined level which is appropriate for detecting candidates of characteristic points, i.e., approximated to the contrast level which is appropriate for the characteristic point detectors to provide high performance according to a transformation curve for approximating the pixel values of an entire resolution image to the logarithm value of the luminance of the subject in the image.

FIG. 17 illustrates an example of the transformation curve used for the overall normalization process. As for the overall normalization process, for example, a process for transforming the pixel values of entire image according to a transformation curve (lookup table) like that shown in FIG. 17 obtained by performing so-called the inverse gamma transformation on the pixel values in sRGB space (raising the values to the power of 2.2) and further taking the logarithms thereof may be used. This is because of the following reasons.

Generally, the light intensity I observed as an image may be described as the product of the reflectance R of the subject and the intensity L of the light source (I=R×L). Thus, if the intensity L of the light source changes, the light intensity I observed as an image also changes. If only the reflectance R of the subject is allowed to be evaluated, however, highly accurate face discrimination may be performed without depending on the intensity L of the light source, i.e., without influenced by the luminance of the image.

Here, when the intensity of the light source is L, and the light intensities observed from the subject areas having a reflectance of R1 and R2 are I1 and I2 respectively, the following formula holds true in the logarithmic space thereof.

$$\begin{aligned}\text{Log}(I1) - \log(I2) &= \log(R1 \times L) - \log(R2 \times L) \\ &= \log(R1) + \log(L) - (\log(R2) + \log(L)) \\ &= \log(R1) - \log(R2) \\ &= \log(R1/R2)\end{aligned} \quad (2)$$

That is, the logarithmic transformation of the pixel values of an image means that the image is transformed into a space in which the reflectance ratio is represented as the difference. In such space, only the reflectance of the subject that does not dependent on the intensity L of the light source may be evaluated. In other words, the contrast in an image that differs according to the luminance (here, the difference itself of the pixel values) may be adjusted.

In the mean time, the color space of an image obtained by a device such as a common digital camera or the like is sRGB. sRGB is an international color space standard that defines/standardizes color, saturation, and the like, in order to standardize the difference in color reproducibility between the devices. In the sRGB color space, the pixel value of an image corresponds to the input luminance raised to the power of 1/γ out (=0.45) to enable image output devices having a gamma value of 2.2 to reproduce color appropriately.

Thus, by performing transformation according to a transformation curve obtained through the so-called inverse gamma transformation on the pixel values of the entire image, i.e., raising the values to the power of 2.2, and further taking the logarithms thereof, evaluation of the subject based only on the reflectance that does not depend on the intensity of the light source may be properly performed.

The overall normalization process, to put it another way, is a process for transforming the pixel values of the entire image according to a transformation curve for transforming a certain color space to another having different characteristics.

Performance of such process on images allows the contrast of the images that differs according to the luminance to be adjusted, and thereby the accuracy in the detection of candidates of characteristic points may be improved.

Note that the discriminators included in the characteristic point detectors are generated through learning of sample images normalized in the manner as described above.

The characteristic point search range setting section 43 sets a search range $SR_i$ for each characteristic point $X_i$ on the resolution images so that the search of the characteristic points is performed only in the region where each characteristic point is likely to be present in order to reduce the time required for the detection of candidates of characteristic points. The search ranges are determined based on existence probability distributions of characteristic points statistically obtained through a set of training images that include faces, to be described later, and the search range is set wider for a characteristic point having greater positional variation. The existence probability distributions of characteristic points are stored in the database 50 described above, and the characteristic point search range setting section 43 sets the search range $SR_i$ for each resolution image $S1''_k$, and for each characteristic point $X_i$ by reading out the existence probability distributions of characteristic points from the database 50.

Figure 7:
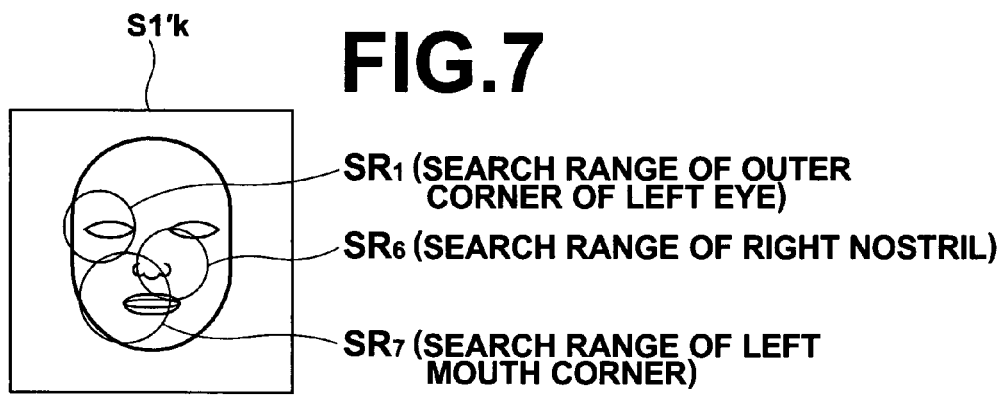
FIG. 7 is a drawing illustrating examples of search regions set for respective characteristic points on an image.

FIG. 7 illustrates, as an example, search ranges SR1, SR6, and SR7 of outer corner of left eye ($X_1$), right nostril ($X_6$), and left mouth corner ($X_7$) respectively. The search range of the left mouth corner is set wider compared to the others as shown in the drawing, since mouth corners are the characteristic points which often differ from person to person, and are likely to vary in comparison with other characteristic points.

If the orientation "f" of a detected face S1 is close to the front, the characteristic point detector selection section 46 selects ten different types of characteristic point detectors for detecting the following characteristic points respectively: outer corner of left eye ($X_1$); inner corner of left eye ($X_2$); inner corner of right eye ($X_3$); outer corner of right eye ($X_4$); left nostril ($X_5$); right nostril ($X_6$); left mouth corner ($X_7$); right mouth corner ($X_8$); midpoint of upper lip ($X_9$); and midpoint of lower lip ($X_{10}$). In the mean time, if the orientation "f" of a detected face S1 is close to an angle of 45 degrees, it selects seven different types of characteristic point detectors for detecting the following characteristic points respectively: outer corner of left eye ($X_1$); inner corner of left eye ($X_2$); inner corner of right eye ($X_3$); outer corner of right eye ($X_4$); nose tip ($X_{11}$); left mouth corner ($X_7$); and right mouth corner ($X_8$).

The detection performing section 44 detects a candidate of each type of specified characteristic point among the characteristic points $X_i$ within a specified search region of each of the normalized resolution images $S1''_k$ using a characteristic point detector selected from the characteristic point detector group $D_i$.

The database 50 has stored therein each existence probability distribution $P_{ij}$ of each face characteristic point $X_j$ when a position $x_i$ of another face characteristic point $X_i$ is taken as a reference, which is statistically obtained in advance.

The existence probability distribution $P_{ij}$ is an existence probability distribution of the correct point of one characteristic point with respect to the position of another characteristic point detected by a certain characteristic point detector, which is provided for each pair of two different characteristic points, a characteristic point $X_i$ and another characteristic point $X_j$. The positional relationship between characteristic points is represented by the existence probability distributions of a plurality of these pairs. Here, the existence probability distribution of the correct point of the characteristic point $X_i$ specified by the coordinate $x_i$ with respect to the output coordinate $x_j$ of a detector is defined as $P_{ij}(x_i|x_j)$, which is represented by a two-dimensional histogram.

In order to obtain the existence probability distribution $P_{ij}$, first, face detection is performed on a training image set (several thousands of images with correct coordinates of characteristic points of a face inputted therein), and the images are normalized so that the faces locate at a reference position. FIG. 3 illustrates an example case where faces are detected from images, and the images are normalized such that the faces locate in the center thereof with a predetermined size.

Figures 9, 10A, 10B, 10C:
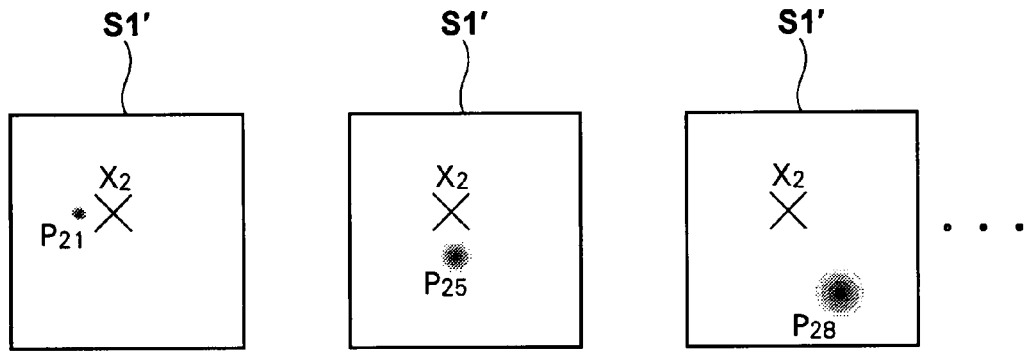
FIG. 9 is a drawing illustrating examples of weighting factors used for integrating existence probability distributions of characteristic points (second one).
FIGS. 10A to 10C are drawings illustrating examples of existence probability distributions of characteristic points.

Then, a characteristic point $X_i$ is detected by a characteristic point detector $D_i$ from the normalized image, and the difference between the coordinate $x_i$ of the characteristic point $X_i$ and the correct coordinate $x_j$ of another characteristic point $X_j$ is compared for each pair of two different characteristic points, the characteristic point $X_i$ and the another characteristic point $X_j$, and the results are added up. FIGS. 10A to 10C illustrate examples of existence probability distributions $P_{ij}$ obtained through the learning described above. Here, the positions of the characteristic points detected by characteristic point detectors are denoted by "x", and the existence probability distributions of target characteristic points are represented by shading on the images, and the position having a higher existence probability is indicated by denser shading. FIG. 10A illustrates an existence probability distribution $P_{21}$ of the point of the outer corner of the left eye (position coordinate $x_1$) with respect to the position coordinate $x_2$ of the position of the inner corner of the left eye detected by a left eye inner corner detector $D_2$. FIG. 10B illustrates an existence probability distribution $P_{25}$ of the point of the left nostril (position coordinate $x_5$) with respect to the position coordinate $x_2$ of the point of the inner corner of the left eye. FIG. 10C illustrates an existence probability distribution $P_{28}$ of the point of the right mouth corner (position coordinate $x_8$) with respect to the position coordinate $x_2$ of the point of the inner corner of the left eye. The resolution of the two-dimensional histogram represented by the existence probability distribution $P_{ij}$ is ¼ of the pixel size of the normalized image $S1$, for example, 100×100 pixel size when the normalized image $S1$ has a pixel size of 200×200 in order to improve learning efficiency and to reduce the amount of information stored in the database.

The characteristic point existence probability distribution integration section 60 obtains existence probability distributions $P_{ij}(x_i|Q_{jt})$ of each characteristic point $X_i$ on the input image $S0$ when each position coordinate $q_{jt}$ of each candidate $Q_{jt}$ of another characteristic point $X_j$ is taken as a reference, using the existence probability distributions $P_{ij}$ stored in the database 50, and integrates the existence probability distributions according to the following formula.

$$P_i = \sum_{\substack{j=1 \\ j \neq i}}^{n} \sum_{t=1}^{k} \frac{1}{k'} \times \text{weight}(i, j) \times P_{ij}(x_i|q_{jt}) \quad (3)$$

Where: $P_i$ is the integrated existence probability distribution of a characteristic point $X_i$; $P_{ij}(x_i|q_{jt})$ is the existence probability distribution of the characteristic point $X_i$ (position coordinate $x_i$) when the position coordinate $q_{jt}$ of the $t^{th}$ candidate of the characteristic point $X_j$ is taken as a reference; "k" and "k'" are the number of candidates of the characteristic point $X_j$; weight (i, j) is the weighting factor for the existence probability distribution $P_{ij}(x_i|q_{jt})$; and "n" is the number of defined target characteristic points.

The term 1/k' in the formula is a term for normalizing the contribution to the integrated existence probability from a single characteristic point by dividing the added-up probability by the number of candidates of the single characteristic point.

The weighting factor, weight (i, j) regulates the addition rate of obtained existence probability distributions $P_{ij}$. The weighting factor, weight (i, j) is allocated to each of the obtained existence probability distributions $P_{ij}$ such that the greater the standard distance between the reference characteristic point $X_j$ and the target characteristic point $X_i$, the smaller the weighting factor, weight (i, j).

FIG. 8 illustrates examples of the weighting factors, weight (i, j) described above. As illustrated, for the combination of, for example, outer and inner corners of left eye, or left and right mouth corners, a large weighting factor is allocated to the existence probability distribution thereof, since the standard structural distance between the characteristic points of the pair is relatively small. On the other hand, for the combination of outer corner of left eye and left mouth corner, or outer corner of right eye and right mouth corner, a small weighting factor is allocated to the existence probability distribution thereof, since the standard structural distance between the characteristic points of the pair is relatively great.

By changing the weight according to the standard structural distance between the two characteristic points in the manner as describe above, instead of adding the obtained existing probability distributions $P_{ij}$ at the same rate, variations arising from the difference in the size of face components and positional relationship thereof, and the difference in face orientation may be minimized.

In case that many candidates are detected for a single characteristic point, the amount of calculation by the formula described above would be increased and the calculation time would be prolonged. Therefore, for example, if the number of candidates k amounts to six or more, the calculation may be performed for the top five in the detected score SCD.

The existence probability distribution $P_i$ integrated in the manner as described above may be regarded as an estimation result of the position of a characteristic point viewed from the position of another characteristic point.

The characteristic point estimation section 70 calculates the probabilities in the integrated existence probability distribution $P_1$ of each characteristic point $X_i$ of the face as shape scores SCG that indicate the shape likelihood of the face component, and estimates the true point of the characteristic point $X_i$ from the candidates $Q_{it}$ thereof based on the magnitude of the shape scores SCG and the magnitude of the detection scores SCD when the candidates $Q_{it}$ of the characteristic point Xi are detected. In the present embodiment, the shape score SCG, i.e., the point of a position having a highest existence probability in the integrated existence probability distribution $P_i$ of the characteristic point $X_i$ is regarded as a representative point $C_i$, and a candidate having a highest detection score SCD among those included in a predetermined region centered approximately on the representative point $C_1$ is estimated as the true point of the characteristic point. This is based on the concept that globally, the integrated existence probability distribution has a higher reliability, and locally, the characteristic point detector has a higher reliability. The representative point $C_i$ may be defined according to the formula shown below.

$$C_i = \operatorname{argmax} \sum_{\substack{j=1 \\ j \neq i}}^{n} \sum_{t=1}^{k} \frac{1}{k'} \times \operatorname{weight}(i, j) \times P_{ij}(x_i | q_{jt}) \quad (4)$$

The method of estimating the true point of a characteristic point is not limited to the present embodiment. For example, the representative point $C_i$, which is the point of a position having a highest shape score SCG, i.e., the existence probability in the integrated existence probability distribution $P_i$ of the characteristic point $X_i$, may be estimated directly as the true point of the characteristic point. Alternatively, among the candidates $Q_{it}$ of the characteristic point $X_i$, the candidate having a highest shape score SCG, i.e., the existence probability of the candidate in the integrated existence probability distribution $P_i$, may be estimated as the true point of the characteristic point.

Still further, among the candidates $Q_{it}$ of the characteristic point $X_i$, the candidate having a highest total value of the shape score SCG, i.e., the existence probability of the position of the candidate in the integrated existence probability distribution $P_i$ and the detection score SCD thereof may be estimated as the true point of the characteristic point.

The non-detected characteristic point supplement section 80 supplies the position of a non-detected characteristic point among the defined "n" characteristic points $X_i$ through analogical estimation based on the positions of detected characteristic points, and outputs position information of all of the characteristic points. In the present embodiment, the integrated existence probability distribution of a non-detected characteristic point, which is an existence probability distribution integrated by the characteristic point existence probability distribution integration section 60, is used, and the representative point $C_i$, which is the point of a position having a highest existence probability on the existence probability distribution, is supplied as the characteristic point. The accuracy of the supplementing method described above, however, is relatively low, since a non-detected characteristic point is obtained from the integrated existence probability distribution in a straightforward manner. If higher detection accuracy is required, the use of a supplement method that uses major shape elements, like ASM may provide more accurate results.

A process performed in the present embodiment will now be described. FIG. 11 is a flowchart illustrating the process performed in the present embodiment. First, input of an image S0, which is a detection target image for a face and the target characteristic points thereof, is accepted by the image input section 10 (step ST1). Here, a series of many images S0 may be accepted in succession. Then, all of the faces S1 included in the image S0 are detected, and further the positions of the eyes and orientations "f" of the faces S1 are detected by the face detection section 20 (step ST2). One of the detected faces S1 is selected by the face normalization section 30 (step ST3), and a normalized face image S1' of the selected face image S1 is obtained by the face normalization section 30 by cutting out an image, which has a predetermined size and includes the face S1 normalized in the relative size and position, from the input image S0 (step ST4). A detection score SCD that indicates a probability that a characteristic point is included in the approximate center of the image of a determination target region specified on the normalized face image S1', and a candidate $Q_{it}$ of each face characteristic point $X_i$ is detected based on a threshold discrimination of the detection score SCD by the characteristic point candidate detection section 40 (step ST5). An existence probability distribution $P_{ij}(x_i | Q_{jt})$ of each characteristic point $X_i$ on the input image S0, when each position coordinate $q_{jt}$ of each candidate $Q_{jt}$ of another characteristic point $X_j$ is taken as a reference, is obtained using the existence probability distributions $P_{ij}$ stored in the database 50, and an integrated existence probability distribution $P_i$ is obtained by integrating all of the obtained existence probability distributions by the existence probability distribution integration section 60 (step ST6). The existence probabilities of each characteristic point $X_i$ in the integrated existence probability distribution Pi thereof are obtained as shape scores SCG, and the point of position having a highest detection score SCD among the candidates within a predetermined region with the point of position having a highest shape score SCG as the representative point thereof is estimated as the true point of the characteristic point by the existence probability characteristic point estimation section 70 (step ST7). Then, a non-detected characteristic point among the defined characteristic points $X_i$ is supplied through analogical estimation based on the positions of the detected characteristic points by the non-detected characteristic point supplement section 80 (step ST8). Here, a determination is made by the non-detected characteristic point supplement section 80 whether the detection of characteristic points is performed on all of the detected faces S1 (step ST9), and if the determination result is positive, the process is terminated after information of detected face characteristic point group X of each detected face S1 is outputted (step ST10). On the other hand, if the determination result is negative, the process returns to step ST3 to select a new face image S1 not yet processed, and the process is continued. The process for detecting a candidate of a characteristic point performed by the characteristic point candidate detection section 40, and the process for estimating a characteristic point performed by the characteristic point estimation section 70 include the following process sequences.

Figure 12:
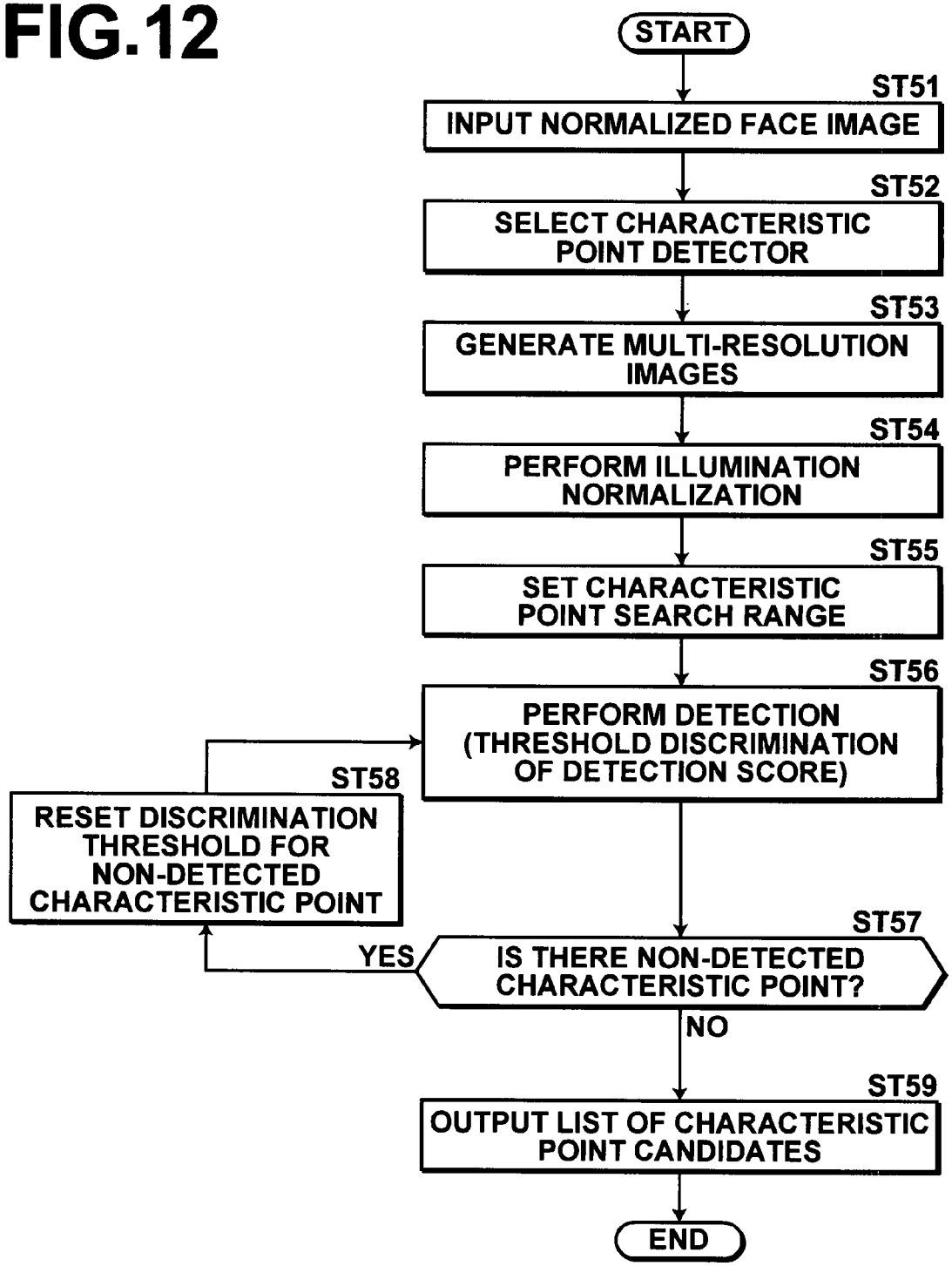
FIG. 12 is a flowchart illustrating a process for detecting candidates of characteristic points.

The process for detecting a candidate of a characteristic point will be described first. FIG. 12 is a flowchart illustrating the process for detecting a candidate of a characteristic point. When a normalized face image S1' is inputted to the characteristic point candidate detection section 40 together with information of the orientation "f" of the face (step ST51), the type of characteristic point detector to be used is selected by the characteristic point detector selection section 46 according to the orientation "f" of the face (step ST52). Further, a plurality of resolution images $S1'_k$ is generated by the multi-resolution image generation section 41 from the inputted normalized face image S1' (step ST53). When the resolution images $S1'_k$ are generated, an overall normalization process is performed on the resolution images $S1'_k$ by the illumination normalization section 42, and thereby normalized resolution images $S1''_k$, normalized in the contrast of the image density, are obtained (step ST54). A search range $SR_i$ for each characteristic point $X_i$ is set on each of the normalized resolution images $S1''_k$ by the characteristic point search range setting section 43 (step ST55). Discrimination target regions are set on each image of the normalized resolution image $S1''_k$, and a detection score SCD of the image of each discrimination target region is calculated to detect a candidate $Q_{it}$ of each characteristic point $X_i$ through threshold discrimination by the detection performing section 44 using the characteristic point detector selected by the characteristic point detector selection section 46 (step ST56). Here, a determination is made whether there is any characteristic point whose candidate has not been detected (step ST57), if the determination result is positive, the threshold value for the characteristic point is decreased (step ST58) and the process for detecting a candidate of the characteristic point is performed again (step ST56). On the other hand, if the determination result is negative, i.e., if a determination is made that candidates for all of the characteristic points are detected, the process is terminated after outputting a list of the detected characteristic point candidates (step ST59). Note that the determination in step ST57 is performed only once, and a list of only detected candidates is outputted after the threshold value is reset once, even if there is still a characteristic point whose candidate has not been detected yet.

Figure 13:
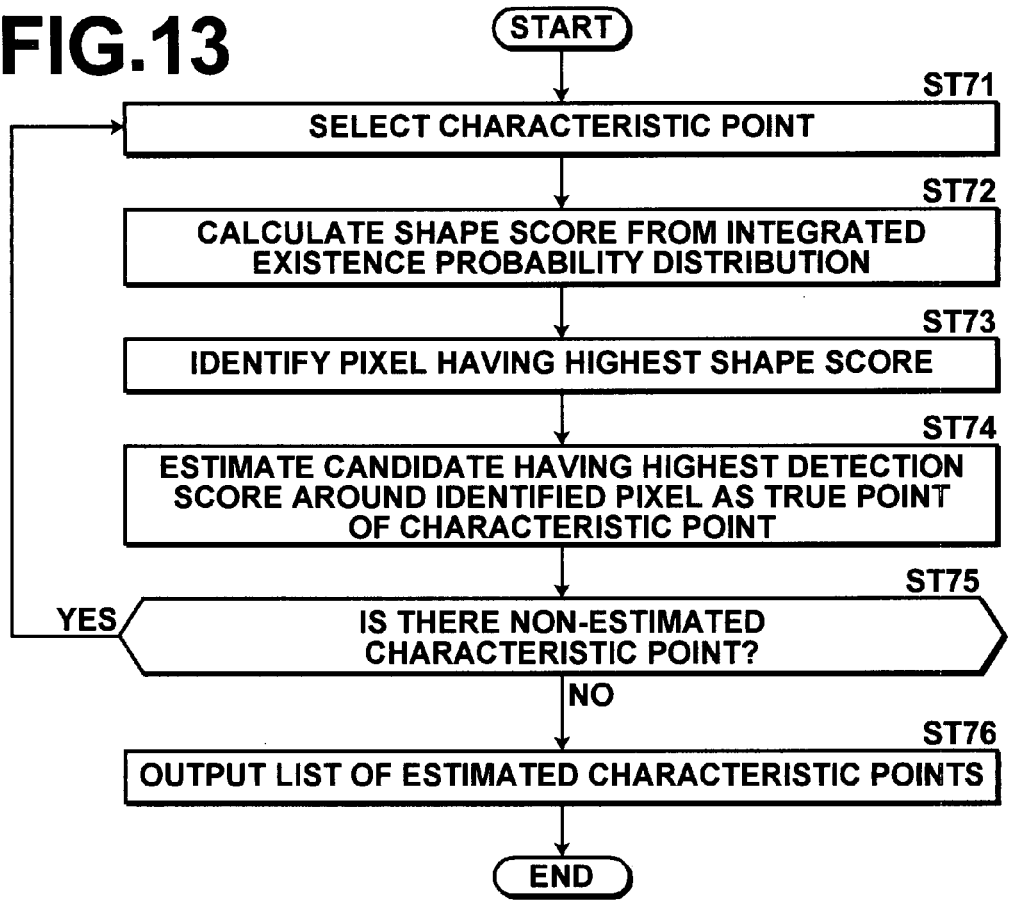
FIG. 13 is a flowchart illustrating a process for estimating characteristic points.
Figures 14A, 14B, 14C:
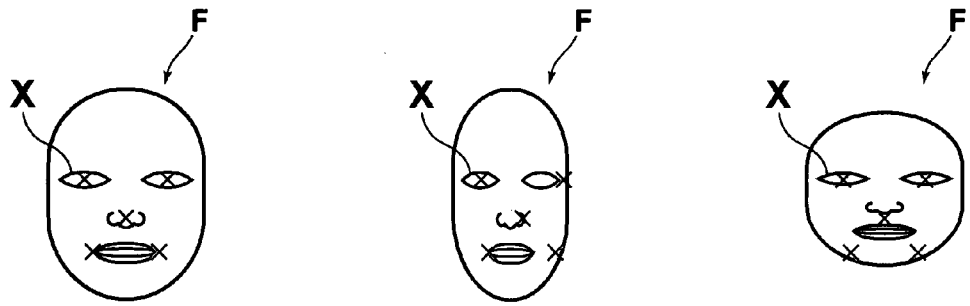
FIGS. 14A to 14C are drawings illustrating the difference between the average positions of characteristic points of a face and actual characteristic points when the orientation of the face is varied.
Figure 15:
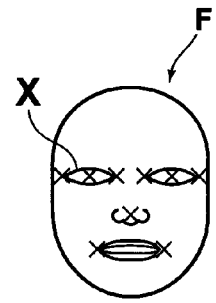
FIG. 15 is a drawing illustrating that characteristic points are concentrated on a specific face component.

Next, the process for estimating characteristic points will be described. FIG. 13 is a flowchart illustrating the process for estimating characteristic points. First, one characteristic point Xa is selected from the target characteristic points, candidates of which have been detected, is selected (step ST71). Then, shape scores SCG of the selected characteristic point Xa are calculated from the integrated existence probability distribution Pa integrated by the characteristic point existence probability distribution integration section 60 (step ST72), and the point (pixel) of a position having a highest shape score SCG is identified (step ST73). Then, one of the candidates of the characteristic point Xa having a highest detection score SCD located within a predetermined region is estimated as the true point of the characteristic point (step ST74). Here, a determination is made whether there is any characteristic point, having a detected candidate thereof, to be estimated (step ST75). If the determination result is positive, the process returns to step ST71 to select a new characteristic point having a detected candidate thereof. On the other hand, if the determination result is negative, the process is terminated after outputting a list of estimated characteristic points (step ST76).

According to the face characteristic point detection system of the present embodiment, for each combination of two different characteristic points of a plurality of predetermined target characteristic points of a human face, an existence characteristic point distribution is obtained in advance, which is an existence probability distribution of one of the characteristic points on an image when the position of the other characteristic point is taken as a reference characteristic point statistically obtained in advance using samples. Then, a candidate of each of the plurality of characteristic points is detected from a detection target image. Thereafter, using the existence probability distributions obtained in advance, an existence probability distribution for at least one of the plurality of target characteristic points with respect to each of the other characteristic points or each of the detected candidates is obtained, which is an existence probability distribution of the target characteristic point that indicates existence probabilities thereof when the position of the detected candidate of another characteristic point is taken as a reference characteristic point, and the obtained existence characteristic distributions are integrated. Then, based on the magnitude of the existence probabilities in the integrated existence probability distribution of the target characteristic point, the true point of the target characteristic point on the detection target image is estimated. Here, when integrating the existence probability distributions, a weighting factor is allocated to each of the existence probability distributions to be integrated according to the positional relationship between the candidate of the reference characteristic point and the target characteristic point, and the probability distributions to be integrated are integrated using the weighting factors. That is, when performing the integration, a low contribution rate is allocated to the existence probability distribution of the characteristic point located farther from the position of the reference characteristic point, in consideration of likelihood that the farther the location of the target characteristic point from the reference characteristic point, the greater will be the departure from the average position of the target characteristic point, and hence the lower will be the reliability of the existence probability distribution of such characteristic point. Therefore, the influence arising from variations in the orientation, size, positional relationship between face components, and the like of the face included in the detection target image may be minimized, and the target characteristic points may be detected accurately and reliably.

In the present embodiment, the weighting factors of respective pairs of face characteristic points used for integrating existence probability distributions of characteristic points are all set to values other than 0 (zero). But, other methods may also be employed. For example, a method in which characteristic points are grouped such that those concentrated within a relatively narrow specific place are categorized into the same group, and the weighting factor for a combination of two characteristic points belonging to the same group is set to 0 (zero) may be employed.

FIG. 9 is a table illustrating example weighting factors weight (i, j) provided in the manner as described above. In the table, face characteristic points are grouped in the following manner. Namely, outer corner and inner corner of left eye belong to a group of left eye, inner corner and outer corner of right eye belong to a group of right eye, left nostril and right nostril belong to a group of nose, left mouth corner belongs to a group of left mouth corner, and right mouth corner belongs to a group of right mouth corner. The table illustrates the weighting factors for combinations of characteristic points belonging different groups, and the weighting factor for a combination of characteristic points belonging to the same group is set to 0 (zero).

In this way, erroneous detections of characteristic points may be minimized by preventing the balance of the positions of characteristic points contributing to the integration of existence probability distributions of a certain characteristic point from being disturbed due to greater influence from the characteristic point locating at a specific fixed location even when the density of defined characteristic points is biased.

So far an exemplary embodiment of the present invention has been described. But, the method, apparatus, and the program therefor are not limited to the embodiment described above. It would be appreciated that various modifications, additions, and subtractions may be made thereto without departing from the spirit and scope of the present invention.

What is claimed is:

1. A characteristic point detection method, comprising the steps of:
   detecting a candidate of each of a plurality of predefined target characteristic points of a predetermined object from a detection target image;
   obtaining an existence probability distribution for at least one of the plurality of predefined target characteristic points with respect to each of the detected candidates of the plurality of predefined target characteristic points other than the at least one of the plurality of predefined target characteristic points by using an existence probability distribution statistically obtained in advance for each combination of two different characteristic points of the plurality of predefined target characteristic points, the existence probability distribution being an existence probability distribution of one of the two different characteristic points on an image with respect to the position of the other characteristic point as a reference characteristic point, in the combination of the two different characteristic points, and integrating the obtained existence probability distributions; and
   estimating, using a processor, the true point of the target characteristic point on the detection target image based on the magnitude of the existence probabilities of the target characteristic point in the integrated existence probability distribution thereof,
   wherein the integration step performs the integration by weighting each of the obtained existence probability distributions according to the positional relationship between the reference characteristic point and the target characteristic point.

2. The characteristic point detection method according to claim 1, wherein the integration step performs the integration by normalizing the existence probability distributions obtained with respect to the same reference characteristic point by the number thereof.

3. The characteristic point detection method according to claim 2, wherein the integration step performs the integration according to the following formula:

$$P_i = \sum_{\substack{j=1 \\ j \neq i}}^{n} \sum_{t=1}^{k} \frac{1}{k'} \times \text{weight}(i, j) \times P_{ij}(x_i | q_{jt})$$

where: $P_i$ is the integrated existence probability distribution of the characteristic point $X_i$; $x_i$ is the position coordinate of the characteristic point $X_i$; $q_{jt}$ is the position coordinate of $t^{th}$ candidate $Q_{jt}$ of the characteristic point $X_j$; $P_{ij}(x_i|q_{jt})$ is the existence probability distribution of the characteristic point $X_i$ when the position coordinate $q_{jt}$ of the candidate $Q_{jt}$ is taken as a reference; "k" and "k'" are the number of candidates of the characteristic point $X_i$; weight (i, j) is the weighting factor for the existence probability distribution $P_{ij}(x_i|q_{jt})$; and "n" is the number of defined target characteristic points.

4. The characteristic point detection method according to claim 3, wherein the estimation step estimates a candidate having a highest certainty value among the candidates included in a predetermined region represented by the point of a position having a highest existence probability in the integrated existence probability distribution of the target characteristic point as the true point thereof.

5. The characteristic point detection method according to claim 3, wherein the estimation step estimates a candidate whose position in the integrated existence probability distribution of the target characteristic point corresponds to a highest existence probability among the candidates as the true point thereof.

6. The characteristic point detection method according to claim 1, wherein the integration step performs the integration by allocating a weighting factor to each of the obtained existence probability distributions such that the greater the distance between the reference characteristic point and the target characteristic point, the smaller the weighting factor.

7. The characteristic point detection method according to claim 1, wherein:
   the plurality of predefined target characteristic points are grouped according the positions thereof on the predetermined object; and
   the integration step performs the integration only for the existence probability distribution of the target characteristic point which belongs to a different group from that of the reference characteristic point.

8. The characteristic point detection method according to claim 1, wherein the estimation step estimates the point of a position having a highest existence probability in the integrated existence probability distribution of the target characteristic point as the true point thereof.

9. The characteristic point detection method according to claim 1, wherein:
   the detection step calculates a certainty value that indicates a probability that the image of a discrimination target region of the detection target image includes the target characteristic point, and determines the object represented by the image of the discrimination region to be the candidate of the target characteristic point when the certainty value is greater than or equal to a predetermined threshold value; and the estimation step estimates the true point of the target characteristic point based on the magnitude of the certainty value of the candidate of each of a plurality of predefined target characteristic points in addition to the magnitude of the existence probabilities of the target characteristic point in the integrated existence probability distribution thereof.

10. A characteristic point detection apparatus, comprising:
a characteristic point candidate detection means for detecting a candidate of each of a plurality of predefined target characteristic points of a predetermined object from a detection target image;

an existence probability distribution integration means for obtaining an existence probability distribution for at least one of the plurality of predefined target characteristic points with respect to each of the detected candidates of the plurality of predefined target characteristic points other than the at least one of the plurality of predefined target characteristic points by using an existence probability distribution statistically obtained in advance for each combination of two different characteristic points of the plurality of predefined target characteristic points, the existence probability distribution being an existence probability distribution of one of the two different characteristic points on an image with reference to the position of the other characteristic point, as a reference characteristic point in the combination of the two different characteristic points, and integrating the obtained existence probability distributions; and a characteristic point estimation means for estimating the true point of the target characteristic point on the detection target image based on the magnitude of the existence probabilities of the target characteristic point in the integrated existence probability distribution thereof, wherein the existence probability distribution integration means performs the integration by weighting each of the obtained existence probability distributions according to the positional relationship between the reference characteristic point and the target characteristic point.

11. The characteristic point detection apparatus according to claim 10, wherein the existence probability distribution integration means performs the integration by normalizing the existence probability distributions obtained with respect to the same reference characteristic point by the number thereof.

12. The characteristic point detection apparatus according to claim 11, wherein the existence probability distribution integration means performs the integration according to the following formula:

$$P_i = \sum_{\substack{j=1 \\ j \neq i}}^{n} \sum_{t=1}^{k} \frac{1}{k'} \times \mathrm{weight}(i,\ j) \times P_{ij}(x_i | q_{jt})$$

where: $P_i$ is the integrated existence probability distribution of the characteristic point $X_i$; $x_i$ is the position coordinate of the characteristic point $X_i$; $q_{jt}$ is the position coordinate of $t^{th}$ candidate $Q_{jt}$ of the characteristic point $X_j$; $P_{ij}(x_i|q_{jt})$ is the existence probability distribution of the characteristic point $X_i$, when the position coordinate $q_{jt}$ of the candidate $Q_{jt}$ is taken as a reference; "k" and "k'" are the number of candidates of the characteristic point $X_j$; weight (i, j) is the weighting factor for the existence probability distribution $P_{ij}(x_i|q_{jt})$; and "n" is the number of defined target characteristic points.

13. The characteristic point detection apparatus according to claim 12, wherein the characteristic point estimation means estimates a candidate having a highest certainty value among the candidates included in a predetermined region represented by the point of a position having a highest existence probability in the integrated existence probability distribution of the target characteristic point as the true point thereof.

14. The characteristic point detection apparatus according to claim 12, wherein the characteristic point estimation means estimates a candidate whose position in the integrated existence probability distribution of the target characteristic point corresponds to a highest existence probability among the candidates as the true point thereof.

15. The characteristic point detection apparatus according to claim 10, wherein the existence probability distribution integration means performs the integration by allocating a weighting factor to each of the obtained existence probability distributions such that the greater the distance between the reference characteristic point and the target characteristic point, the smaller the weighting factor.

16. The characteristic point detection apparatus according to claim 10, wherein:
the plurality of predefined target characteristic points are grouped according the positions thereof on the predetermined object; and
the existence probability distribution integration means performs the integration only for the existence probability distribution of the target characteristic point which belongs to a different group from that of the reference characteristic point.

17. The characteristic point detection apparatus according to claim 10, wherein the characteristic point estimation means estimates the point of a position having a highest existence probability in the integrated existence probability distribution of the target characteristic point as the true point thereof.

18. The characteristic point detection apparatus according to claim 10, wherein:
characteristic point candidate detection means calculates a certainty value that indicates a probability that the image of a discrimination target region of the detection target image includes the target characteristic point, and determines the object represented by the image of the discrimination region to be the candidate of the target characteristic point when the certainty value is greater than or equal to a predetermined threshold value; and
the characteristic point estimation means estimates the true point of the target characteristic point based on the magnitude of the certainty value of the candidate of each of the plurality of predefined target characteristic points in addition to the magnitude of the existence probabilities of the target characteristic point in the integrated existence probability distribution thereof.

19. A non-transitory computer readable medium storing a program including instructions for causing a computer to perform a process comprising the steps of:
detecting a candidate of each of a plurality of predefined target characteristic points of a predetermined object from a detection target image;
obtaining an existence probability distribution for at least one of the plurality of predefined target characteristic points with respect to each of the detected candidates of the plurality of predefined target characteristic points other than the at least one of the plurality of predefined target characteristic points by using an existence probability distribution statistically obtained in advance for each combination of two different characteristic points of the plurality of predefined target characteristic points, the existence probability distribution being an existence probability distribution of one of the two different characteristic points on an image with respect to the position of the other characteristic point, as a reference characteristic point, in the combination of the two different characteristic points, and integrating the obtained existence probability distributions; and estimating the true point of the target characteristic point on the detection target image based on the magnitude of the existence probabilities of the target characteristic point in the integrated existence probability distribution thereof, wherein the integration step performs the integration by weighting each of the obtained existence probability distributions according to the positional relationship between the reference characteristic point and the target characteristic point.

20. The non-transitory computer readable medium according to claim 19, wherein the integration step performs the integration by normalizing the existence probability distributions obtained with respect to the same reference characteristic point by the number thereof.

21. The non-transitory computer readable medium according to claim 20, wherein the integration step performs the integration according to the following formula:

$$P_i = \sum_{\substack{j=1 \\ j \neq i}}^{n} \sum_{t=1}^{k} \frac{1}{k'} \times \text{weight}(i, j) \times P_{ij}(x_i | q_{jt})$$

where: $P_i$ is the integrated existence probability distribution of the characteristic point $X_i$; $x_i$ is the position coordinate of the characteristic point $X_i$; $q_{jt}$ is the position coordinate of $t^{th}$ candidate $Q_{jt}$ of the characteristic point $X_j$; $P_i(x_i|q_{jt})$ is the existence probability distribution of the characteristic point $X_i$ when the position coordinate $q_{jt}$ of the candidate $Q_{jt}$ is taken as a reference; "k'" and "k" are the number of candidates of the characteristic point $X_j$; weight (i, j) is the weighting factor for the existence probability distribution $P_{ij}(x_i|q_{jt})$; and "n" is the number of defined target characteristic points.

22. The non-transitory computer readable medium according to claim 21, wherein the estimation step estimates a candidate having a highest certainty value among the candidates included in a predetermined region represented by the point of a position having a highest existence probability in the integrated existence probability distribution of the target characteristic point as the true point thereof.

23. The non-transitory computer readable medium according to claim 21, wherein the estimation step estimates a candidate whose position in the integrated existence probability distribution of the target characteristic point corresponds to a highest existence probability among the candidates as the true point thereof.

24. The non-transitory computer readable medium according to claim 19, wherein the integration step performs the integration by allocating a weighting factor to each of the obtained existence probability distributions such that the greater the distance between the reference characteristic point and the target characteristic point, the smaller the weighting factor.

25. The non-transitory computer readable medium according to claim 19, wherein:

the plurality of predefined target characteristic points are grouped according the positions thereof on the predetermined object; and the integration step performs the integration only for the existence probability distribution of the target characteristic point which belongs to a different group from that of the reference characteristic point.

26. The non-transitory computer readable medium according to claim 19, wherein the estimation step estimates the point of a position having a highest existence probability in the integrated existence probability distribution of the target characteristic point as the true point thereof.

27. The non-transitory computer readable medium according to claim 19, wherein:

the detection step calculates a certainty value that indicates a probability that the image of a discrimination target region of the detection target image includes the target characteristic point, and determines the object represented by the image of the discrimination region to be the candidate of the target characteristic point when the certainty value is greater than or equal to a predetermined threshold value; and the estimation step estimates the true point of the target characteristic point based on the magnitude of the certainty value of the candidate of each of the plurality of predefined target characteristic points in addition to the magnitude of the existence probabilities of the target characteristic point in the integrated existence probability distribution thereof.

* * * * *